(12) United States Patent
McKeon et al.

(10) Patent No.: US 10,248,141 B2
(45) Date of Patent: Apr. 2, 2019

(54) NON-INVASIVE PRESSURE MEASUREMENT SYSTEM

(71) Applicant: Cameron International Corporation, Houston, TX (US)

(72) Inventors: Michael Anthony McKeon, Longford (IE); Conor Gray, Longford (IE); Declan Elliott, Longford (IE)

(73) Assignee: Cameron International Corporation, Houston, TX (US)

( * ) Notice: Subject to any disclaimer, the term of this patent is extended or adjusted under 35 U.S.C. 154(b) by 223 days.

(21) Appl. No.: 15/154,764

(22) Filed: May 13, 2016

(65) Prior Publication Data

US 2017/0329356 A1 Nov. 16, 2017

(51) Int. Cl.
*F16K 31/02* (2006.01)
*G05D 16/20* (2006.01)
*G01L 9/00* (2006.01)
*G01L 11/06* (2006.01)
*G01L 19/14* (2006.01)

(52) U.S. Cl.
CPC ........ *G05D 16/2013* (2013.01); *G01L 9/0002* (2013.01); *G01L 9/003* (2013.01); *G01L 9/0004* (2013.01); *G01L 9/0005* (2013.01); *G01L 9/0007* (2013.01); *G01L 9/0025* (2013.01); *G01L 11/06* (2013.01); *G01L 19/147* (2013.01)

(58) Field of Classification Search
CPC ..... G05D 16/2013; G01L 9/003; G01L 11/06; G01L 9/0002; G01L 9/0004; G01L 9/0005; G01L 9/0007; G01L 9/0025; G01L 19/147

USPC ....... 137/485, 487.5, 557; 73/700, 703, 718, 73/719, 724, 725
See application file for complete search history.

(56) References Cited

U.S. PATENT DOCUMENTS

| | | | |
|---|---|---|---|
| 2,944,199 A | | 7/1960 | Hudson |
| 4,061,015 A | * | 12/1977 | Fish .......................... G01M 3/02 73/49.5 |
| 4,194,401 A | | 3/1980 | Claassen et al. |
| 4,538,466 A | * | 9/1985 | Kerber .................. G01L 9/0005 29/25.41 |
| 5,040,415 A | * | 8/1991 | Barkhoudarian ....... G01F 1/667 374/143 |
| 7,418,877 B2 | * | 9/2008 | Gysling .................... G01F 1/36 73/861.42 |

(Continued)

FOREIGN PATENT DOCUMENTS

GB 2477714 A 8/2011

OTHER PUBLICATIONS

PCT International Search Report & Written Opinion for PCT Application No. PCT/US2017/032526 dated Aug. 31, 2017; 18 Pages.

(Continued)

*Primary Examiner* — Minh Le
(74) *Attorney, Agent, or Firm* — Fletcher Yoder, P. C.

(57) ABSTRACT

A system includes a safety system having one or more valves configured to block a flow of fluid from a source to a destination, a non-invasive pressure measurement system having a plurality of non-invasive pressure sensors configured to monitor a pressure of the fluid without directly contacting the fluid, and a controller configured to receive feedback from the non-invasive pressure measurement system and to adjust a position of the one or more valves of the safety system based on the feedback.

19 Claims, 16 Drawing Sheets

(56) References Cited

U.S. PATENT DOCUMENTS

| | | | |
|---|---|---|---|
| 7,805,999 B2* | 10/2010 | Waid | E21B 47/06 73/700 |
| 8,714,022 B2* | 5/2014 | Peng | G01L 19/04 73/718 |
| 9,228,888 B2* | 1/2016 | Luo | G01H 5/00 |
| 2005/0039520 A1 | 2/2005 | Davis et al. | |
| 2005/0171710 A1* | 8/2005 | Gysling | G01F 1/7084 702/54 |
| 2005/0246111 A1* | 11/2005 | Gysling | G01F 1/34 702/45 |
| 2006/0048583 A1* | 3/2006 | Gysling | G01F 1/666 73/861.04 |
| 2008/0103629 A1* | 5/2008 | Milanovic | G05B 9/02 700/282 |
| 2009/0241672 A1* | 10/2009 | Gysling | G01N 29/024 73/597 |
| 2013/0162270 A1* | 6/2013 | Kishida | G01R 27/2605 324/661 |
| 2014/0261778 A1 | 9/2014 | Hamilton | |
| 2015/0094988 A1 | 4/2015 | Schumacher | |
| 2015/0198494 A1* | 7/2015 | Koltay | G01F 1/383 73/861.42 |
| 2015/0282720 A1* | 10/2015 | Goldshtein | A61B 5/6869 600/561 |
| 2016/0265996 A1* | 9/2016 | Hayashi | G01L 9/0072 |
| 2017/0159405 A1* | 6/2017 | Hazel | E21B 34/08 |
| 2017/0219395 A1* | 8/2017 | Imai | G01F 1/383 |
| 2017/0219396 A1* | 8/2017 | Imai | G01F 1/383 |

OTHER PUBLICATIONS

SIS Tech Solution: "High Integrity Pressure Protection Systems (HIPPS)", Chemical Engineering Progress, Nov. 1, 2000 (Nov. 1, 2000), XP055395635, DOI: http:people.clarkson.edu/~wwilcox/Design/hipps.pdf.

Xue Li et al: "An Ultrasound-Based Liquid Pressure Measurement Method in Small Diameter Pipelines Considering the Installation and Temperature", Sensors, vol. 15, No. 4, Apr. 9, 2015 (Apr. 9, 2015), pp. 8253-8265.

Anonymous: "High-integrity pressure protection system—Wikipedia", Sep. 2, 2014 (Sep. 2, 2014) URL:https://en.wikipedia.org/w/index.php?title=High-integrity_pressure_protection_system&oldid=623875016 [retrieved on Aug. 2, 2017].

* cited by examiner

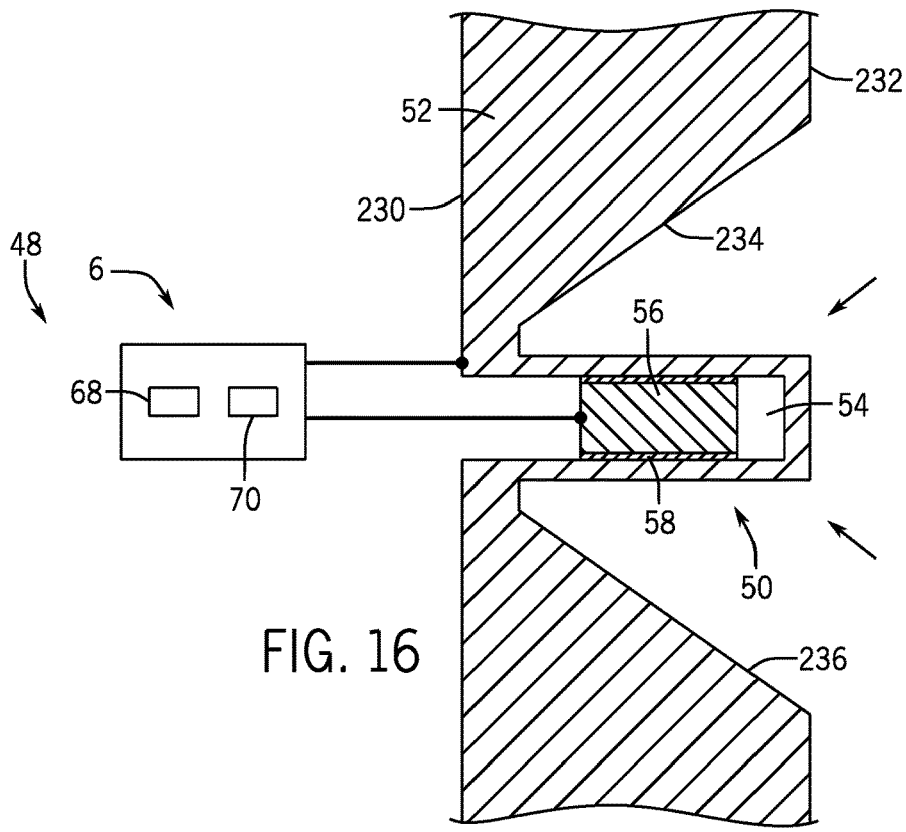
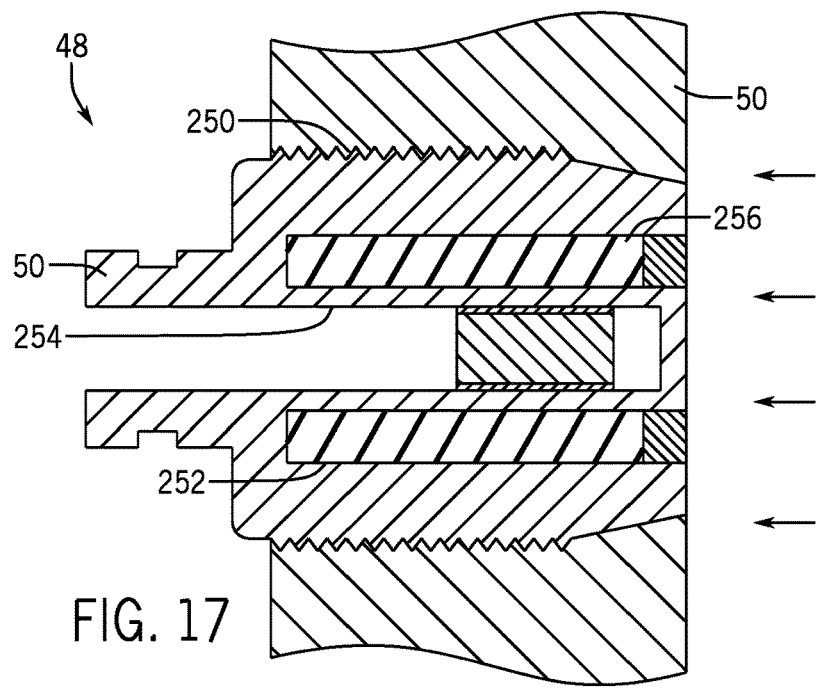

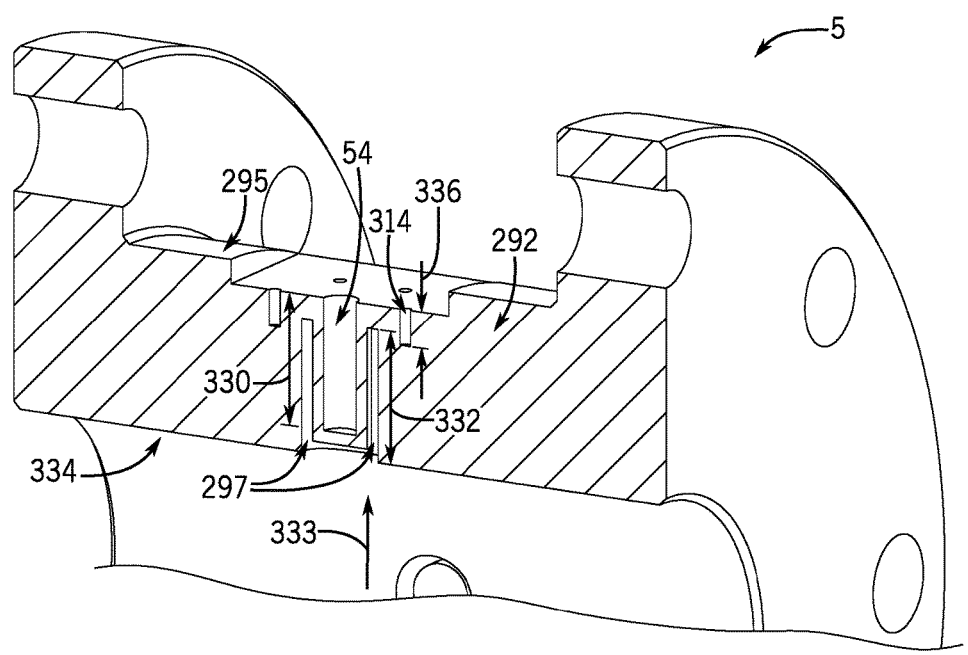
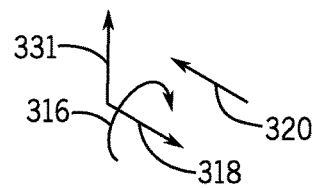
FIG. 23

NON-INVASIVE PRESSURE MEASUREMENT SYSTEM

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Hydrocarbon drilling and extraction operations, involve transporting and/or using high-pressure fluids (e.g., oil, gas, water, steam, chemicals, and/or hydraulic fluid). For example, high-pressure oil and/or natural gas may flow through extraction equipment as it exits a well. Drilling and extraction operations may also use high-pressure hydraulic fluid to control equipment. In order to monitor and control the pressurized fluids, pressure sensors may be used. Unfortunately, existing pressure sensors may be invasive and less resistive to over pressurization.

BRIEF DESCRIPTION OF THE DRAWINGS

Various features, aspects, and advantages of the present disclosure will become better understood when the following detailed description is read with reference to the accompanying figure, wherein:

FIG. 16 is a cross-sectional view of an embodiment of capacitance based pressure sensor that may be utilized to control the HIPPS of FIG. 1, in accordance with an embodiment of the present disclosure;

FIG. 17 is a cross-sectional view of an embodiment of the capacitance based pressure sensor that may be utilized to control the HIPPS of FIG. 1, in accordance with an embodiment of the present disclosure;

FIG. 23 is a partial cutaway view of an embodiment of the sensor adapter of FIGS. 21 and 22 showing a cavity configured to receive a non-invasive pressure sensor of the non-invasive pressure measurement system, in accordance with an embodiment of the present disclosure;

DETAILED DESCRIPTION OF SPECIFIC EMBODIMENTS

Figure 1:
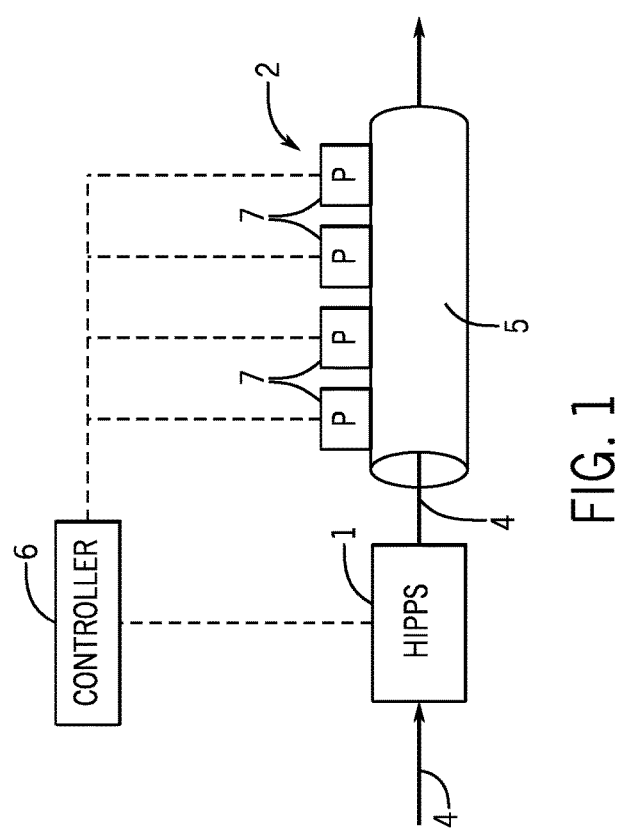
FIG. 1 is a schematic of a high integrity pressure protection system (HIPPS) that includes a non-intrusive pressure measurement system, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Embodiments of the present disclosure are directed toward a non-invasive pressure measurement system that may be incorporated into a safety system, such as a safety valve system. In some embodiments, the non-invasive pressure measurement system may be used in a high integrity pressure protection system (HIPPS). While the present discussion focuses on the non-invasive pressure measurement system incorporated into the HIPPS, it should be recognized that embodiments of the present disclosure are not limited to the HIPPS, but may be applicable to other safety systems.

The HIPPS may be utilized in a hydrocarbon extraction system and/or hydrocarbon pipelines to block a flow of fluid when a pressure threshold in a conduit is exceeded. For example, in some cases, it may be desirable to direct fluid from a well toward a pipeline, a storage vessel, and/or another suitable destination that may include a relatively low pressure. However, the pipeline, storage vessel, and/or other suitable destination may not be suitable for receiving fluid from the well when the pressure of such fluid exceeds the threshold pressure (e.g., a predetermined pressure based on regulations and/or standards for a specific destination of the fluid). Accordingly, the HIPPS may be configured to block the flow of fluid from the well to the destination when the pressure in the well and/or a conduit conveying the fluid exceeds the threshold pressure.

Without the disclosed embodiments, the HIPPS may utilize one or more pressure transmitters that are coupled to a primary conduit via one or more leakage lines (e.g., separate conduits that divert a flow of fluid away from a primary flow path). In some embodiments, the pressure transmitters may monitor pressure when one or more root valves and/or one or more double block and bleed valves open to enable the flow of fluid to reach the pressure transmitters. However, diverting the fluid from the primary conduit may be undesirable as additional components (e.g., piping and/or valves) may be included in the HIPPS, thereby increasing costs. Additionally, in some cases, the leakage lines may clog and/or otherwise be blocked by solid particles that may be included in the fluid flowing through the primary conduit. Accordingly, it is now recognized that a non-intrusive pressure measurement system (e.g., a pressure measurement system that does not directly contact the fluid in the primary conduit) may be desirable to eliminate leakage lines, thereby reducing costs and/or clogging that may occur in such lines.

The non-invasive pressure measurement system that may be utilized with the HIPPS may include multiple different types of non-invasive pressure sensors. For example, the non-invasive pressure measurement system may use 1, 2, 3, 4, 5, or more of a capacitance based pressure sensor, a strain gauge pressure sensor, an ultrasonic pressure sensor, a surface acoustic wave (SAW) pressure sensor, a magnetic pressure sensor, a fiber optic pressure sensor, or any combination thereof.

In embodiments that utilize a capacitance based pressure sensor, the non-invasive pressure management system may include a housing and a core separated by an insulative material to form a capacitor. In operation, the housing is exposed to a pressurized fluid that compresses the housing radially inward. As the housing moves radially inward, the housing compresses the insulative material against the core changing the thickness of the insulative material and therefore the distance between the core and the housing. The change in distance between the housing and core changes the capacitance of the non-invasive pressure measurement system. For example, the capacitance increases as the distance between the housing and core decreases, and likewise the capacitance decreases when the distance between the housing and core increases. In this way, the non-invasive pressure measurement system enables non-invasive pressure measurement (e.g., pressure measurement without direct contact with the fluid) by correlating a capacitance to a fluid pressure. Regardless of the type of non-invasive pressure sensor that is utilized, the non-invasive pressure measurement system may measure the pressure of the fluid in the conduit without directly contacting the fluid and/or diverting the fluid from a primary flow path. Accordingly, the non-invasive pressure measurement system may reduce costs (e.g., by eliminating the leakage lines from the HIPPS), while accurately measuring the pressure of the fluid in the conduit.

For example, FIG. 1 is a schematic of an embodiment of a high integrity pressure protection system 1 (HIPPS) that may utilize a non-invasive pressure measurement system 2. As used herein, the HIPPS 1 may include one or more valves (e.g., solenoid operated valves, quick exhaust valves, gate valves, choke valves, ball valves, and/or another suitable valve) configured to close when a pressure of a fluid exceeds a first threshold value, and/or close when the pressure of the fluid falls below a second threshold value. As shown in the illustrated embodiment, the non-invasive pressure measurement system 2 may be disposed downstream of the HIPPS 1 with respect to a flow of fluid. However, in other embodiments, the non-invasive pressure measurement system 2 may be disposed upstream of the HIPPS 1 with respect to the flow of the fluid. The non-invasive pressure measurement system 2 may be disposed on a conduit 4 directing the flow of the fluid from a source toward a destination. In some embodiments, the non-invasive pressure measurement system 2 may be disposed in a conduit section or sensor adapter 5 (e.g., a non-invasive pressure measurement insert that includes a fluid passage) that may be coupled to the conduit 4. In some embodiments, the sensor adapter 5 may have a circular or non-circular cross-section, such as a polygonal, rectangular, or square cross-section. Inside, the sensor adapter 5 may have a cylindrical or non-cylindrical bore (e.g., fluid passage). On an outer surface, the sensor adapter 5 may include a notch or groove that receives the non-invasive pressure measurement system 2, such that the non-invasive pressure measurement system 2 may monitor a pressure of the fluid flowing through the fluid passage.

Additionally, the non-invasive pressure measurement system 2 may be coupled to a controller 6 (e.g., wirelessly or through a wired connection). The controller 6 may also be coupled to the HIPPS 1 (e.g., an actuator of a valve of the HIPPS 1). Accordingly, the controller 6 may open and/or close one or more valves of the HIPPS based on feedback received from the non-invasive pressure management system 2. For example, when the non-invasive pressure measurement system 2 determines that a pressure of the fluid in the conduit 4 exceeds a first predetermined pressure threshold, the controller 6 may instruct the HIPPS to close one or more valves, thereby blocking a flow of the fluid through the conduit 4. Additionally, when the non-invasive pressure measurement system 2 determines that the pressure of the fluid in the conduit 4 falls below a second predetermined pressure threshold, less than the first predetermined threshold, the controller 6 may instruct the HIPPS to open one or more valves, thereby enabling fluid to flow through the conduit 4. Further, the controller 6 may be configured to adjust a position of the one or more valves of the HIPPS based on feedback from the non-invasive pressure measurement system 2 utilizing any suitable pressure-based control.

As discussed above, the non-invasive pressure measurement system 2 may include one or more different types of non-invasive pressure sensors 7 (e.g., pressure sensors that do not directly contact the fluid). For example, as shown in the illustrated embodiment of FIG. 1, the non-invasive pressure measurement system 2 may include four of the non-invasive pressure sensors 7. In some embodiments, the non-invasive pressure sensors 7 may be any combination of non-invasive pressure sensors (e.g., a capacitance based pressure sensor, a strain gauge pressure sensor, an ultrasonic pressure sensor, a surface acoustic wave (SAW) pressure sensor, a magnetic pressure sensor, a fiber optic pressure sensor, or any combination thereof). It may be desirable to include different types of the non-invasive pressure sensors 7 in the non-invasive pressure measurement system 2 to cover a wide range of operating pressures that may experienced within the conduit 4 (e.g., a given type of non-invasive pressure sensor 7 may have enhanced accuracy within specific pressure ranges). However, in other embodiments, each of the four non-invasive pressure sensors 7 may be the same type of non-invasive pressure sensor 7. Further, while the illustrated embodiment of FIG. 1 shows the non-invasive pressure measurement system 2 having four of the non-invasive pressure sensors 7, it should be recognized that the non-invasive pressure measurement system 2 may include less than four of the non-invasive pressure sensors 7 (e.g., three, two, or one), or more than four of the non-invasive pressure sensors 7 (e.g., five, six, seven, eight, nine, ten, or more).

Figure 2:
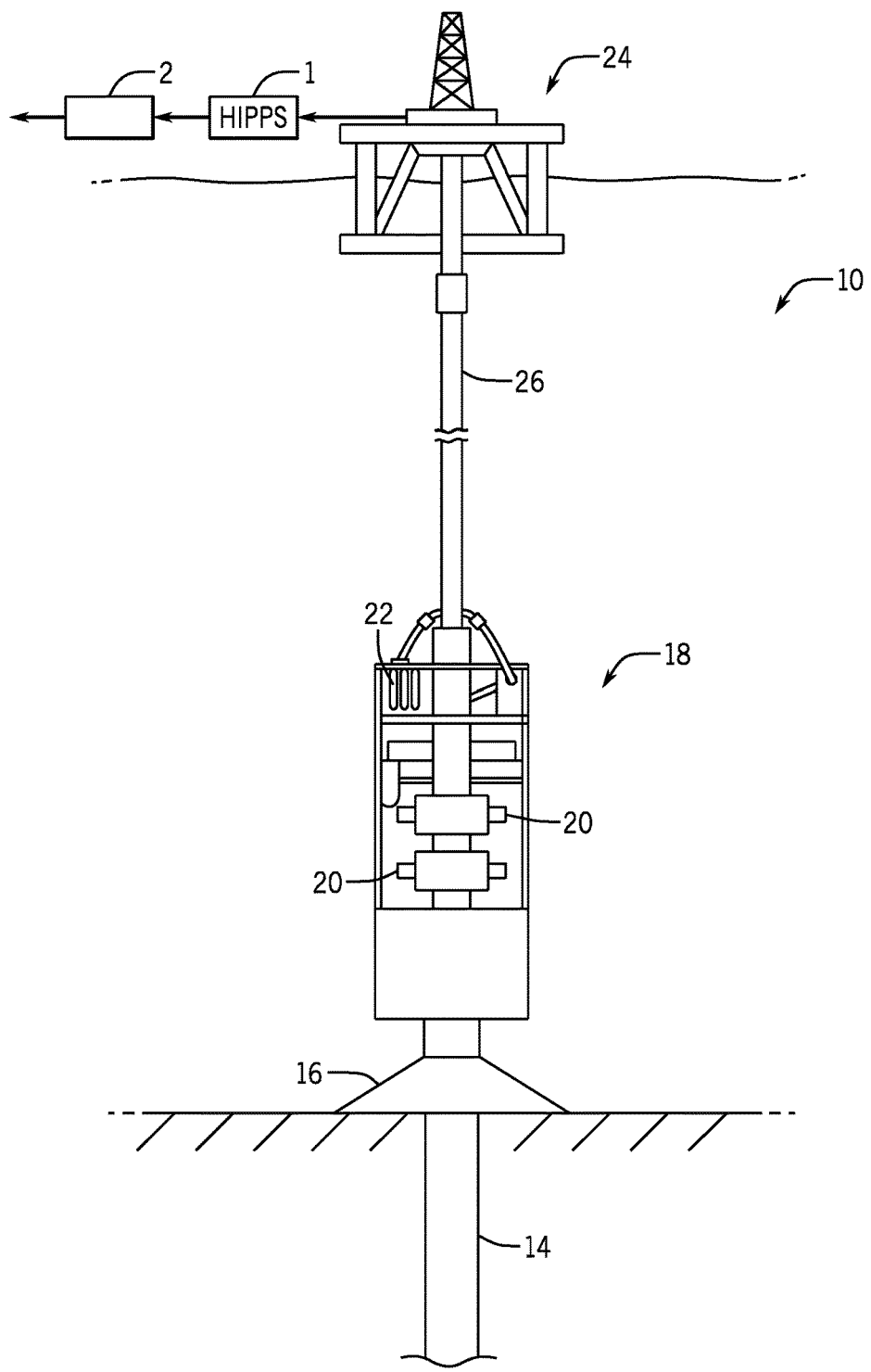
FIG. 2 is a schematic of an embodiment of a hydrocarbon extraction system that includes the HIPPS of FIG. 1, in accordance with an embodiment of the present disclosure.

FIG. 2 is a schematic of an embodiment of a hydrocarbon extraction system 10 used to extract hydrocarbons (e.g., oil and/or natural gas) as well as inject substances, such as chemicals, steams, or other fluids to enhance hydrocarbon extraction. As shown in the illustrated embodiment of FIG. 2, the hydrocarbon extraction system 10 may include the HIPPS 1 and the non-invasive pressure measurement system 2. As will be explained in detail below, the non-invasive pressure measurement system 2 may enable non-invasive high-pressure measurement of fluid (e.g., pressure measurement without direct contact with the fluid) passing through the hydrocarbon extraction system 10 and/or the HIPPS 1. For example, the non-invasive pressure measurement system 2 may enable pressure measurement up to and exceeding 1,000,000 PSI (e.g., 0-100,000 PSI, 0-250,000 PSI, 0-500,000 PSI, 0-750,000 PSI, and 0-1,000,000 PSI).

As illustrated, the hydrocarbon extraction system 10 couples to a well 14 with a wellhead 16. During operation, oil and/or natural gas flow out of the well 14 through the wellhead 16 and into the wellhead stack 18. The wellhead stack 18 generally includes a series of devices and components that control and regulate activities and conditions associated with the well 16. For example, the wellhead stack 18 may include blowout preventers 20, accumulators 22, valves, plugs, seals, etc. that enable the hydrocarbon extraction system 10 to control the flow of fluid (e.g., oil, natural gas, hydraulic fluid, chemicals). The wellhead stack 18 in turn fluidly couples to the surface (e.g., a rig/platform 24) with risers 26, enabling fluid flow into and out of the well 14.

During drilling and production operations, the hydrocarbon system 10 is often exposed to extreme conditions. For example, during drilling and production of a well 14, some of the equipment in the hydrocarbon system 10 may be exposed to pressures up to and exceeding 10,000 pounds per square inch (PSI). Therefore, the hydrocarbon extraction system 10 generally employs various mechanisms, such as seals, plugs, and valves, to control and regulate the well 16. For example, the BOPs 20 may provide emergency fluid pressure containment in the event that a sudden pressure surge escapes from the well 14. Additionally, the HIPPS 1 may be utilized to block a flow of the fluid downstream of the BOPs 20 when a pressure of the fluid flowing from the well 14 exceeds a pressure threshold (e.g., a pressure threshold based on a standard and/or rating). Accordingly, it is in this difficult environment that the non-invasive pressure measurement system 2 enables fluid pressure measurement to control and/or monitor fluid pressure.

Figure 3:
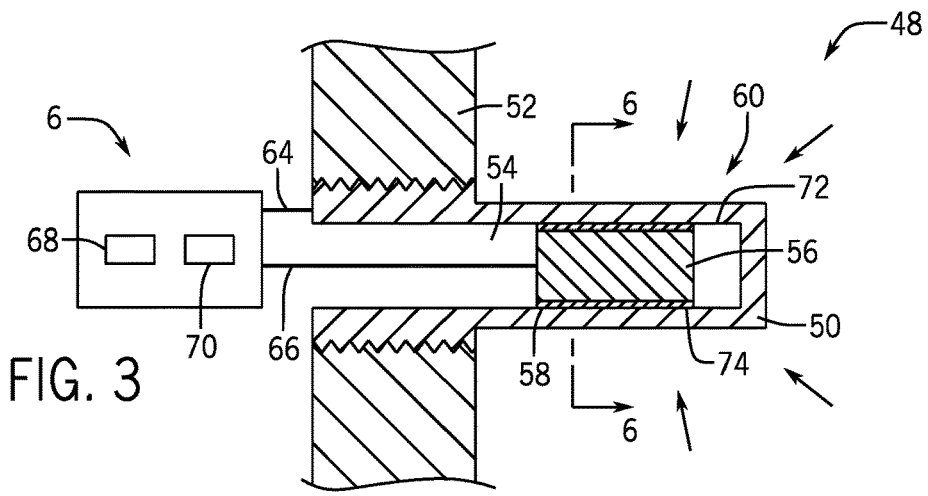
FIG. 3 is a cross-sectional view of an embodiment of the non-invasive pressure measurement system that includes a capacitance based pressure sensor that may be utilized to control the HIPPS of FIG. 1, in accordance with an embodiment of the present disclosure.
Figure 4:
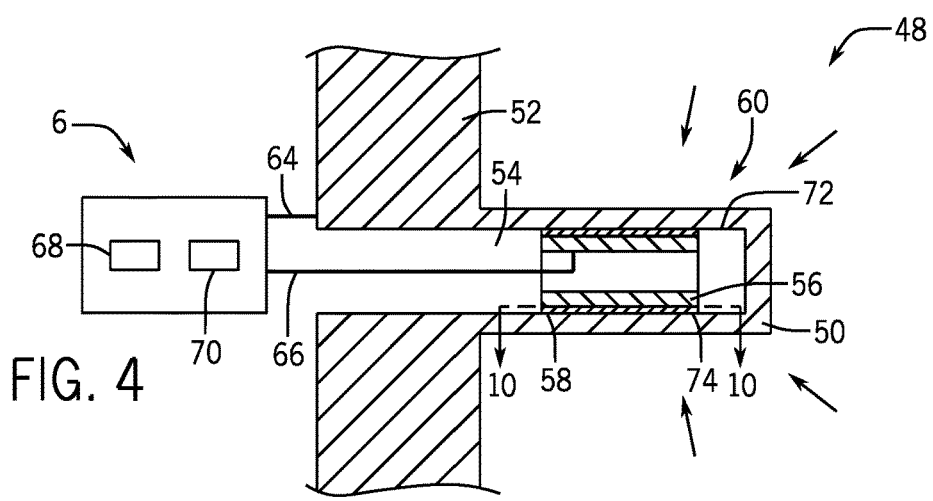
FIG. 4 is a cross-sectional view of an embodiment of the non-invasive pressure measurement system with capacitance based pressure sensor, in accordance with an embodiment of the present disclosure.

FIG. 3 is a cross-sectional view of an embodiment of the non-invasive pressure measurement system 2 that includes a capacitance based pressure sensor 48. The capacitance based pressure sensor 48 may be disposed in a housing 50 (e.g., conductive housing) coupled to a pressure vessel wall 52 (e.g., pipe, container, etc.). For example, the housing 50 may be threadingly coupled, bolted, welded, or a combination thereof to the pressure vessel wall 52. Moreover, FIG. 4 illustrates that the housing 50 may be formed as part of the pressure vessel wall 52 (e.g., one-piece, integral) instead of mechanically coupled, welded, brazed, etc. In this way, the housing 50 is exposed to pressurized fluid within the pressure vessel wall 52.

The housing 50 (e.g., cylinder) includes a cavity 54 enabling the housing 50 to receive a core 56 (e.g., conductive core) and an insulative material 58 (e.g., rubber, plastic, ceramic, elastomer, etc.) of the capacitance based pressure sensor 48. The insulative material 58 separates the core 56 from the housing 50 to form a capacitor 60 using an electrical signal from the controller 6, for example. In operation, the capacitance based pressure sensor 48 detects the fluid pressure by monitoring the change in capacitance between the housing 50 and the core 56. For example, as the fluid pressure increases, the housing 50 compresses the insulative material 58 and changes the distance between the housing 50 and the core 56, thus increasing the capacitance between the core 56 and the housing 50. Likewise, as pressure decreases the insulative material 58 is able to expand and decrease the capacitance between the core 56 and the housing 50. In this way, the capacitance based pressure sensor 48 measures capacitance, such that the controller 6 may correlate the measured capacitance to a change in fluid pressure and enable non-intrusive pressure monitoring of a fluid. In some embodiments, the core 56 and the housing 50 may be made out of the same materials (e.g., conductive, non-conductive, metal) to reduce measurement interference from thermal expansion and contraction of the core 56 and housing 50.

As illustrated, the controller 6 electrically couples to the conductive housing 50 with a wire 64 and to the conductive core 56 with a wire 66 enabling the controller 6 to form the capacitor 60 with the electrical signal. In order to control the electrical signal and measure changes in capacitance, the controller 6 may include a processor 68 that executes instructions stored on a memory 70. In some embodiments, the controller 6 may control equipment (e.g., valves of the HIPPS 1, BOP, etc.) in the hydrocarbon extraction system 10 in response to the measured fluid pressure.

In some embodiments, the housing 50 and/or core 56 may be formed out of a non-conductive material, but with a conductive coating or layer (e.g., metal coating or layer). For example, the housing 50 may include a conductive coating or layer on an interior surface 72 while the core 56 includes a conductive coating or layer on an exterior surface 74 enabling the housing 50 and the core 56 to form the capacitor 60. Furthermore, in some embodiments, the core 56 may be solid, which increases the crush resistance of the capacitance based pressure sensor 48 (e.g., housing) to pressures up to and in excess of 1,000,000 PSI. In some embodiments, the core 56 may be hollow, as illustrated in FIG. 4.

Figure 5:
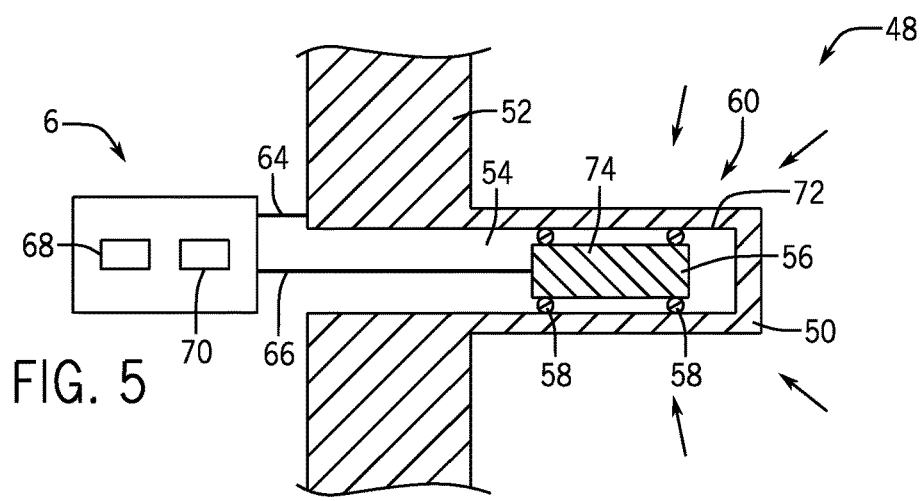
FIG. 5 is a cross-sectional view of an embodiment of the non-invasive pressure measurement system with the capacitance based pressure sensor, in accordance with an embodiment of the present disclosure.

FIG. 5 is a cross-sectional view of an embodiment of the capacitance based pressure sensor 48. In some embodiments, the insulative material 58 may circumferentially wrap around the outer surface 74 of the core 56, instead of extending along the axis of the core 56. For example, the insulative material 58 may include annular sleeves or o-rings that extend about the circumference of the core 56. In some embodiments, the capacitance based pressure sensor 48 may include additional o-rings (e.g., 1, 2, 3, 4, 5, or more) and/or combine pieces of the insulative material 58 that extends both axially along the core 56 as well as circumferentially about the core 56.

Figure 6:
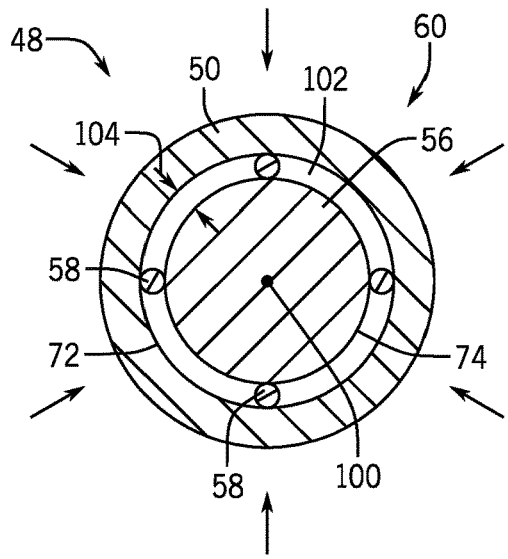
FIG. 6 is a cross-sectional view of an embodiment of the capacitance based pressure sensor in an uncompressed state along line 6-6 of FIG. 3, in accordance with an embodiment of the present disclosure.

FIG. 6 is a cross-sectional view of an embodiment of the capacitance based pressure sensor 48 in an uncompressed state along line 6-6 of FIG. 3. As illustrated, the capacitance based pressure sensor 48 may include multiple pieces of the insulative material 58 spaced (e.g., equally spaced) circumferentially about an axis 100 of the core 56 within a gap 102 (e.g., circumferential gap). While four pieces of the insulative material 58 are illustrated, some embodiments may include 2, 3, 4, 5, or more pieces of the insulative material 58 that separate the housing 50 from the core 56. Moreover, the insulative material 58 may have a variety of cross-sectional shapes including circular, oval, square, rectangular, semi-circular, etc. In an uncompressed state, the insulative material 58 maximizes a distance 104 (e.g., radial distance) between the interior surface 72 of the housing 50 and the outer surface 74 of the core 56, thus reducing the capacitance between the core 56 and the housing 50.

Figure 7:
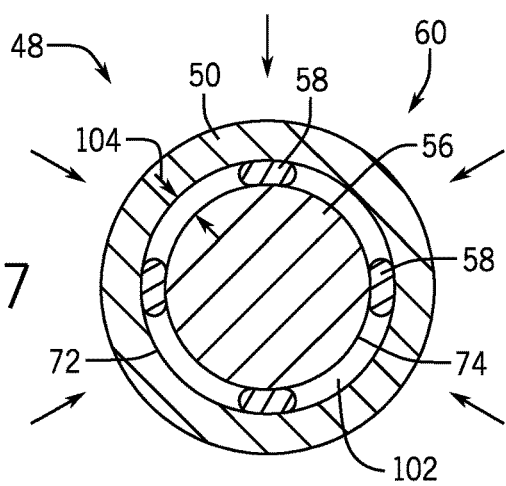
FIG. 7 is a cross-sectional view of an embodiment of the capacitance based pressure sensor in a compressed state along line 6-6 of FIG. 3, in accordance with an embodiment of the present disclosure.

FIG. 7 is a cross-sectional view of an embodiment of the capacitance based pressure sensor 48 of FIG. 6 in a compressed state. In operation, the housing 50 compresses radially inward when exposed to pressurized fluid. As the housing 50 compresses radially inward, the housing 50 compresses the insulative material 58 between the inner surface 72 of the housing 50 and the outer surface 74 of the core 56, causing a reduction in the distance 104. The decrease in the distance 104 increases the capacitance between the housing 50 and the core 56. As explained above, the controller 6 measures the change in the capacitance and then correlates the change in capacitance to the pressure of the fluid compressing the housing 50, thus enabling non-invasive fluid pressure measurement. For example, the controller 6 (e.g., the memory 70) may contain a lookup table(s), an equation, computer model, etc. that enables the controller 6 to determine pressure through a correlation with capacitance.

Figure 8:
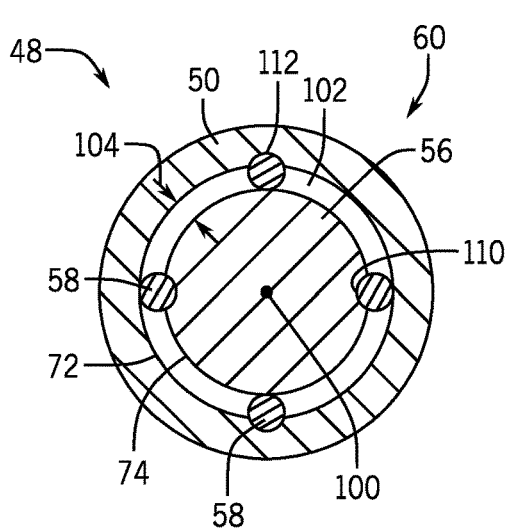
FIG. 8 is a cross-sectional view of an embodiment of the capacitance based pressure sensor along line 6-6 of FIG. 3, in accordance with an embodiment of the present disclosure.

FIG. 8 is a cross-sectional view of an embodiment of the capacitance based pressure sensor 48 along line 6-6 of FIG. 3. In some embodiments, the core 56 and/or the housing 50 may include respective grooves 110 and 112 that receive the same or a different piece of the insulative material 58. In operation, the grooves 110 and 112 resist and/or block the insulative material 58 from moving circumferentially about the axis 100 of the core 56, thereby maintaining an equal or substantially equal distance between the core 56 and the housing 50.

Figure 9:
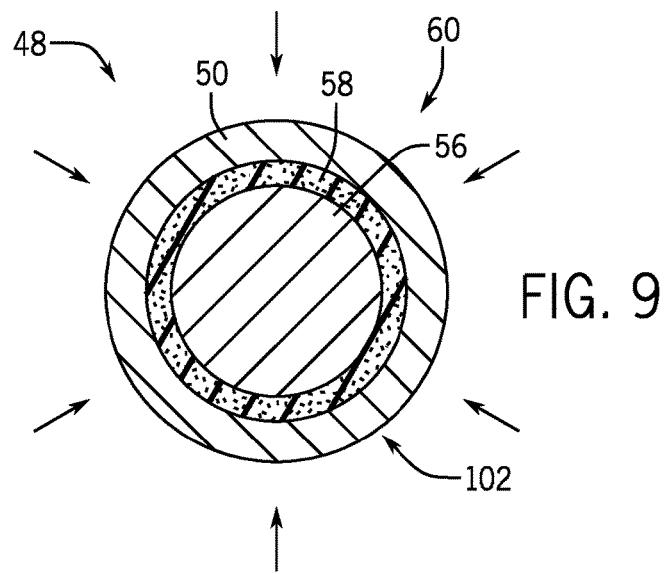
FIG. 9 is a cross-sectional view of an embodiment of the capacitance based pressure sensor along line 6-6 of FIG. 3, in accordance with an embodiment of the present disclosure.

FIG. 9 is a cross-sectional view of an embodiment of the capacitance based pressure sensor 48 along line 6-6 of FIG. 3. As illustrated, the capacitance based pressure sensor 48 may fill the gap 102 with the insulative material 58. For example, the insulative material 58 may be foam. In operation, the insulative material 58 maintains the core 56 and the housing 50 in an equidistant relationship while still enabling the housing 50 to compress under pressure and change the capacitance between the housing 50 and the core 56.

Figure 10:
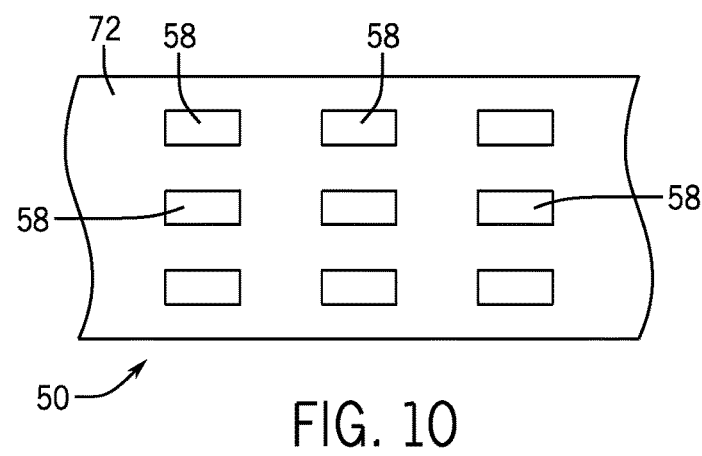
FIG. 10 is a sectional view of an embodiment of capacitance based pressure sensor along line 10-10 of FIG. 4, in accordance with an embodiment of the present disclosure.

FIG. 10 is a sectional view of an embodiment of the capacitance based pressure sensor 48 along line 10-10 of FIG. 4. In some embodiments, the insulative material 58 may include multiple inserts (e.g., 1, 2, 3, 4, 5, 10, 15, or more) that couple about the interior surface 72 of the housing 50 to maintain the distance 104 between the core 56 and the housing 50. For example, the insulative material inserts 58 may be glued and/or inserted into apertures in the housing 50. The inserts may also have any number of shapes including circular, oval, square, triangular, etc. In some embodiments, the insulative material inserts 58 may couple to the core 56 or to the core 56 and the housing 50.

Moreover, the inserts may be arranged into rows, columns, rings, and/or have irregular placement.

Figure 11:
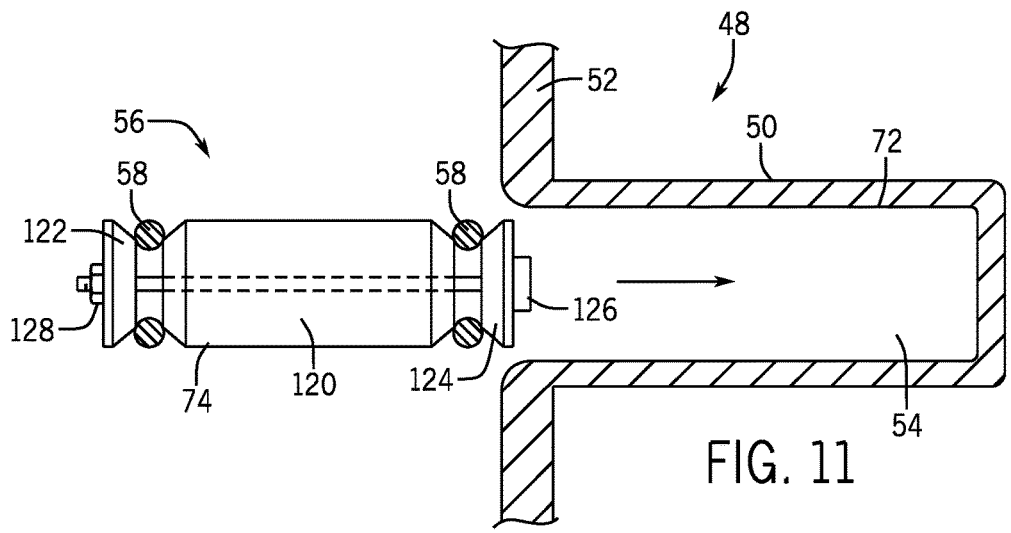
FIG. 11 is a partial cross-sectional view of an embodiment of the capacitance based pressure sensor with a core outside of a housing, in accordance with an embodiment of the present disclosure.

FIG. 11 is a partial cross-sectional view of an embodiment of a core 56 (e.g., core assembly) of the capacitance based pressure sensor 48 outside of a housing 50. As illustrated, the core 56 includes a body 120 with a first end cap 122 and a second end cap 124. In order to couple the first end cap 122 and the second end cap 124 to the body 120, the core 56 includes a fastener 126 (e.g., threaded fastener or bolt) with a mating fastener 128 (e.g., threaded fastener or nut). In FIG. 11 the first end cap 122 and the second end cap 124 are in a relaxed or uncompressed position with respect to the body 120. In this position, the insulative material 58 (e.g., o-rings) are similarly relaxed and unstretched to facilitate insertion of the core 56 into the housing cavity 54. In some embodiments, the first and second end caps 122, 124 may be not be conductive.

Figure 12:
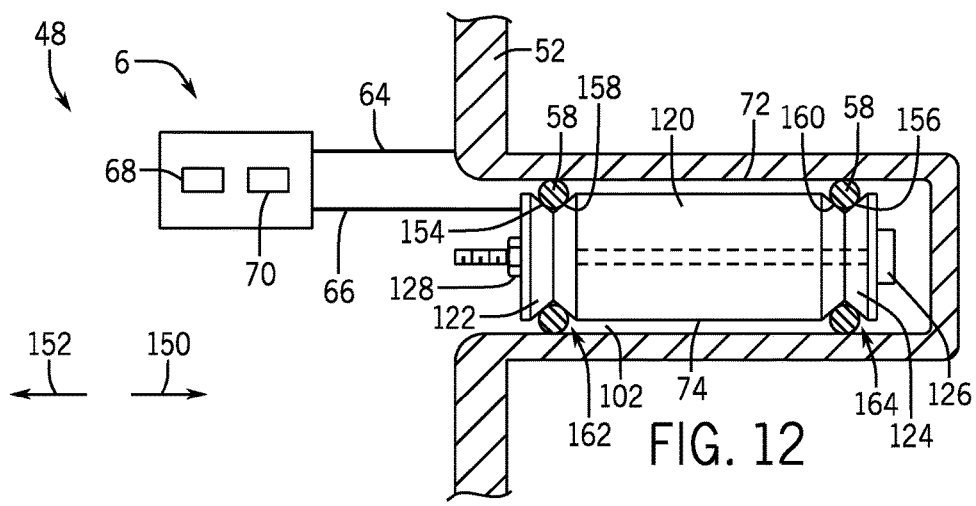
FIG. 12 is a partial cross-sectional view of an embodiment of capacitance based pressure sensor with a core within a housing, in accordance with an embodiment of the present disclosure.

FIG. 12 is a partial cross-sectional view of an embodiment of a core 56 of the capacitance based pressure sensor 48 within the housing 50. Once the core 56 is inserted into the housing 50, the nut 128 may be threaded onto the fastener 126. When the nut 128 threads onto the fastener 126 in an axial direction 150, the nut 128 axially compresses the first end cap 122 against the body in the axial direction 150 and the second end cap 124 against the body 120 in an axial direction 152. The axial compression of the first end cap 122 and the second end cap 124 against the body 120 radially stretches or expands the insulative material 58 and drives the insulative material 58 radially outward and into contact with the housing 50. In this position, the insulative material 58 forms the gap 102 between the housing interior surface 72 and outer surface 74 of the core 56. To facilitate the insulative material 58 radially outward, the first and second end caps 122, 124 may have tapered and/or curved circumferential surfaces 154, 156 that correspond with tapered and/or curved surfaces 158, 160 on the body 120. Together, these tapered and/or curved surfaces 154, 156, 158, and 160 form grooves 162 and 164 (e.g., annular grooves with tapered or curved cross-section) that facilitate expansion of the insulative material 58 and resist axial movement of the insulative material 58 in axial directions 150 and 152.

Figure 13:
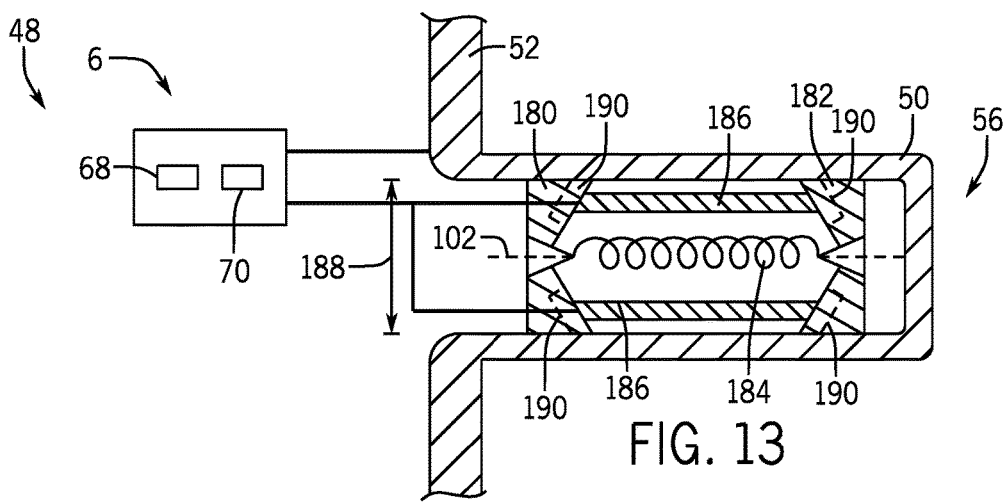
FIG. 13 is a cross-sectional view of an embodiment of the capacitance based pressure sensor that may be utilized to control the HIPPS of FIG. 1, in accordance with an embodiment of the present disclosure.

FIG. 13 is a cross-sectional view of an embodiment of the capacitance based pressure sensor 48. In FIG. 13, the core 56 (e.g., core assembly) includes insulative first and second end caps 180 and 182 that couple together with a spring 184 (e.g., coiled spring) in tension. As illustrated, the spring 184 axially compresses the conductive plates or rods 186 between the first and second end caps 180 and 182. In order to insert the core 56 into the housing 50, the first and second end caps 180 and 182 are pulled away from one another in axial directions 150 and 152 to compress the end caps 180 and 182 about the axis 102, which reduces the diameter 188 of the core 56. Furthermore, as the end caps 180 and 182 axially compress toward one another, the rods 186 slide radially outward in slots 190. Once inside the cavity 54, the end caps 180, 182 expand and the rods 186 slide radially inward toward the axis 102 within the slots 190. The radially inward and outward movement of the rods 186 in the slots 190 enables the core 56 to vary the capacitance between the housing 50 and the rods 186. For example, as the housing 50 radially compresses, the end caps 180, 182 radially compress and move axially away from one another in axial directions 150 and 152. As the end caps 180, 182 move axially away from one another, the rods 190 move radially outward in the slots 190. Similarly, when the pressure on the housing 50 decreases, the spring 184 pulls the end caps 180, 182 closer together in the axial direction and the rods 186 move radially inward. In this way, as the pressure on the housing 50 changes the position of the rods 186, the capacitance between the housing 50 and the rods 186 of the core 56 changes, which enables pressure detection via a correlation between pressure and capacitance.

Figure 14:
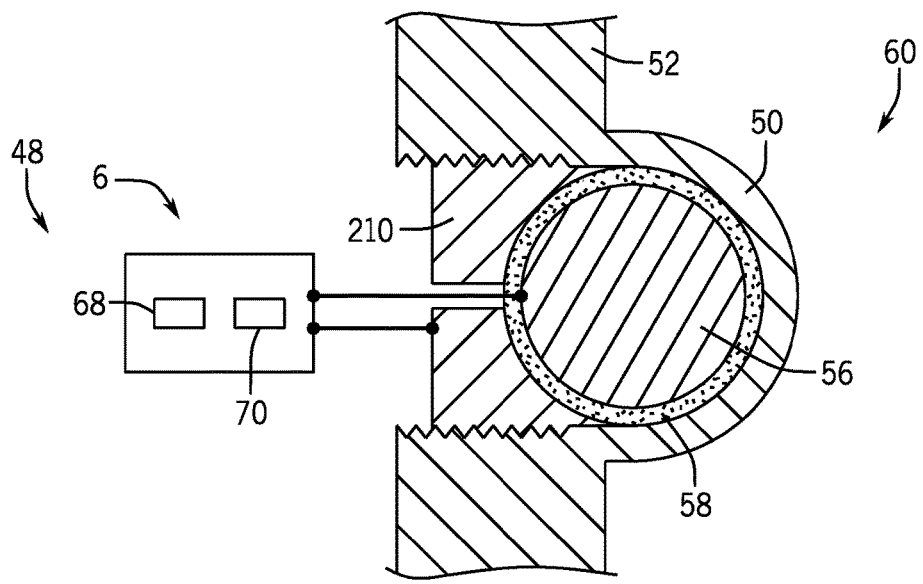
FIG. 14 is a cross-sectional view of an embodiment of the capacitance based pressure sensor with a spherical core, in accordance with an embodiment of the present disclosure.
Figure 15:
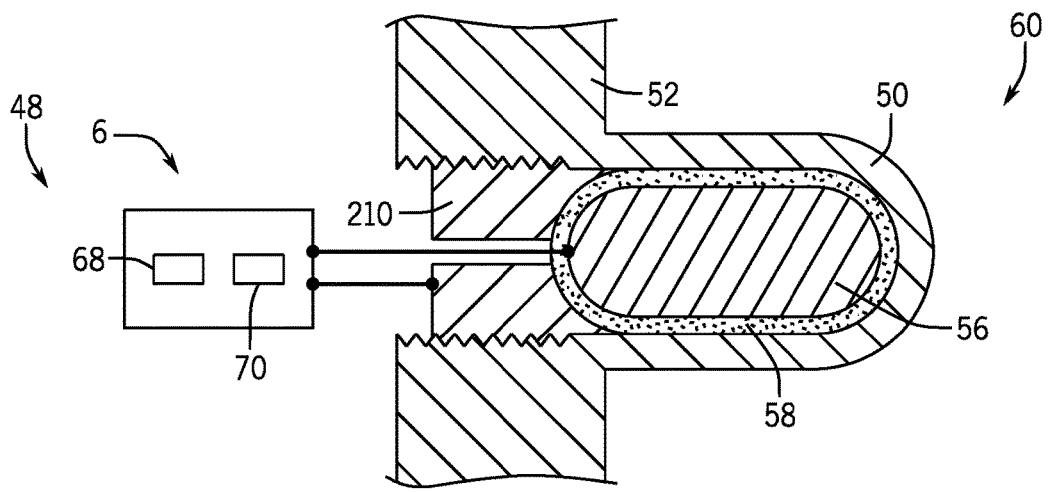
FIG. 15 is a cross-sectional view of an embodiment of capacitance based pressure sensor with an oval core, in accordance with an embodiment of the present disclosure.

FIGS. 14 and 15 are cross-sectional views of embodiments of the capacitance based pressure sensor 48 with a respective spherical core 56 (e.g., ball shaped, round) and semi-spherical housing 50; and an oval core 56 and oval-shaped housing 50. In order to measure capacitance changes indicative of the pressure changes, the capacitance based pressure sensor 48 includes a retaining member 210 (e.g., threaded fastener, stud, plug) that threads into the housing 50 or wall 52 to retain the spherical core 56 within the semi-spherical housing 52; and the oval shaped core 56 within the oval shaped housing 50. In this way, as pressure acts on the housing 50, the housing 50 does not drive the spherical core 56 or oval shaped core 56 out of the housing 50. As explained above, the capacitance based pressure sensor 48 includes the insulative material 58 between the housing 50 and the core 56 in order to form a capacitor 60. The insulative material 58 may be foam that completely encases the core 56; inserts that couple to the core 56, housing 50, and/or retaining member 210; or pieces of insulative material 58 that wrap around the core 56.

FIG. 16 is a cross-sectional view of an embodiment of the capacitance based pressure sensor 48 protected by the wall 52. As illustrated, the capacitance based pressure sensor 48 may rest between an outer surface 230 and an inner surface 232 of the pressure vessel wall 52. In this way, the wall 52 may shield or protect the capacitance based pressure sensor 48 from debris flowing through a pressure vessel (e.g., a pipe, casing, etc.). Moreover, the wall 52 may include sloped or tapered portions 234, 236 that reduce buildup of formations or deposits (e.g., hydrates) as fluid flows around or past the housing 50.

FIG. 17 is a cross-sectional view of an embodiment of the capacitance based pressure sensor 48 capable of incorporation into an existing system with limited or no retrofit. For example, the capacitance based pressure sensor 48 may be an integral unit (e.g., threaded plug) capable of insertion into an existing aperture 250 (e.g., threaded aperture) in a pressure vessel wall 52. As illustrated, the housing 50 includes a slot 252 (e.g., cylindrical) in order to expose a core housing portion 254 surrounding the core 56 to fluid pressure, while simultaneously protecting the core housing portion 254 from fluid flow. In some embodiments, the capacitance based pressure sensor 48 may include an insulative material 256 (e.g., rubber) that transfers pressure from the fluid to the core housing portion 254 while blocking fluid from entering the cylindrical slot 252. In order words, the insulative material 256 may block hydrate formation or deposit formation within the slot 252. In order to retain the insulative material within the slot 252 the capacitance based pressure sensor 48 may include a ring 258 (e.g., a c-ring) that retains the insulative material 256 within the slot 252.

Figure 18:
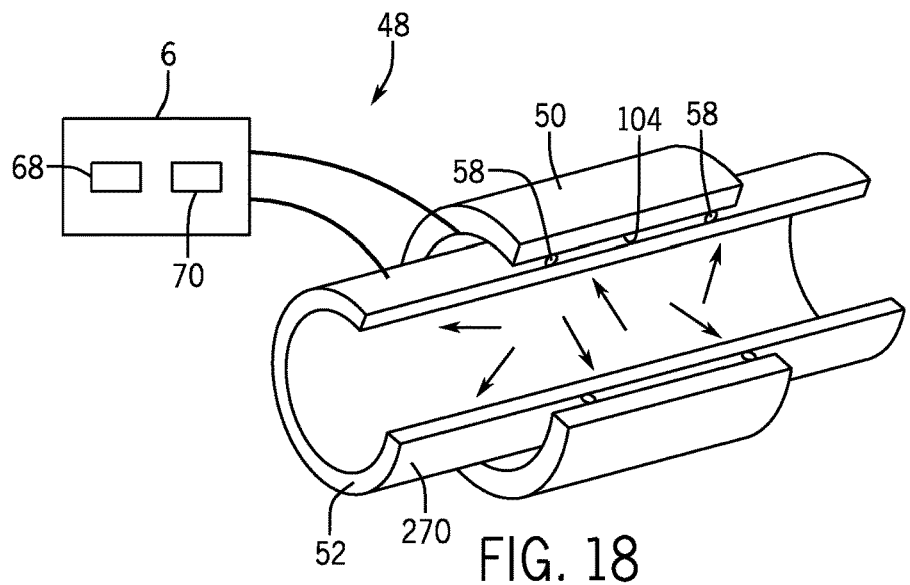
FIG. 18 is a perspective partial cross-sectional view of an embodiment of capacitance based pressure sensor that may be utilized to control the HIPPS of FIG. 1, in accordance with an embodiment of the present disclosure.

FIG. 18 is a perspective cutaway view of an embodiment of the capacitance based pressure sensor 48 that couples around an exterior surface 270 of a pressure vessel wall 52 (e.g., pipe, casing, etc.). In operation, the insulative material 58 compresses between the housing 50 and the pressure vessel wall 52 as the pressure vessel wall 52 radially expands under pressure. As explained above, the housing 50 and the pressure vessel wall 52 form a capacitor that changes in capacitance as the distance 104 between the housing 50 and the pressure vessel 50 decrease. In this way, the capacitance based pressure sensor 48 may wrap around a pressure vessel wall 52 and enable pressure measurement of a fluid in a pressure vessel.

Figure 19:
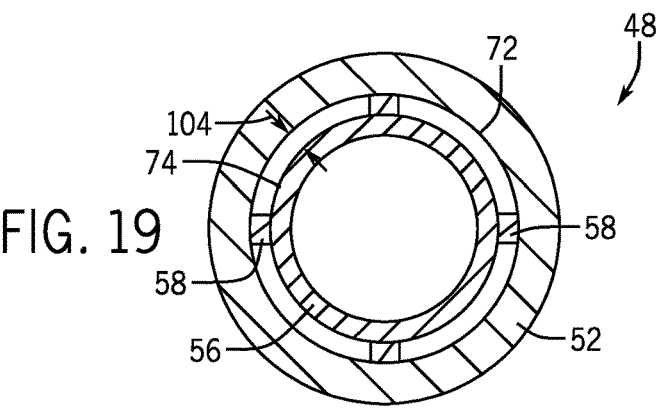
FIG. 19 is a cross-sectional view of an embodiment of the uncompressed capacitance based pressure sensor along line 6-6 of FIG. 3, in accordance with an embodiment of the present disclosure.
Figure 20:
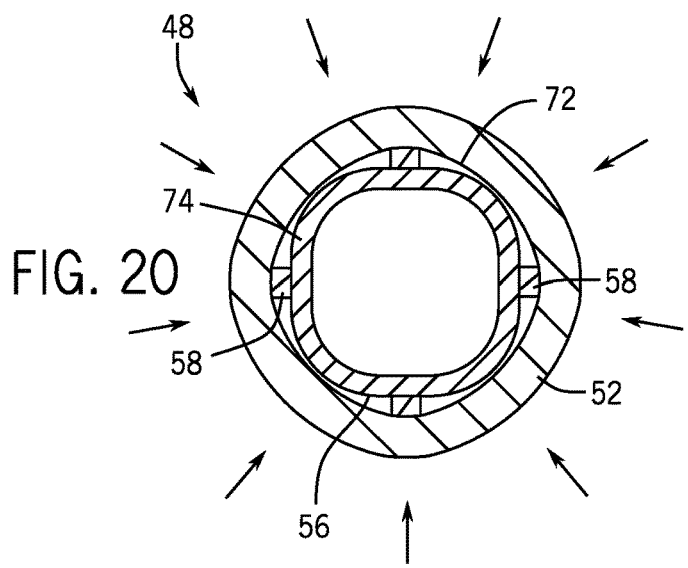
FIG. 20 is a cross-sectional view of an embodiment of a compressed capacitance based pressure sensor along line 6-6 of FIG. 3, in accordance with an embodiment of the present disclosure.

FIGS. 19 and 20 illustrate cross-sectional views of an embodiment of the capacitance based pressure sensor 48 along line 6-6 of FIG. 3. Specifically, FIG. 19 illustrates the capacitance based pressure sensor 48 in an uncompressed state and FIG. 20 illustrates the capacitance based pressure sensor 48 in a compressed state. However, in contrast to the insulative material 58 discussed above, the insulative material 58 in FIGS. 19 and 20 may be an incompressible or substantially incompressible material (e.g., ceramic, etc.). Accordingly, instead of compressing the insulative material 58 to decrease the distance 104 between the housing 50 and the core 56, the core 56 flexes to change the distance 104 between the housing 50 and the core 56. Indeed, FIG. 20 illustrates the housing 50 under pressure with the core 56 flexing between the insulative material 58 as the cylinder 50 compresses the insulative material 58 into the core 56.

Figure 21:
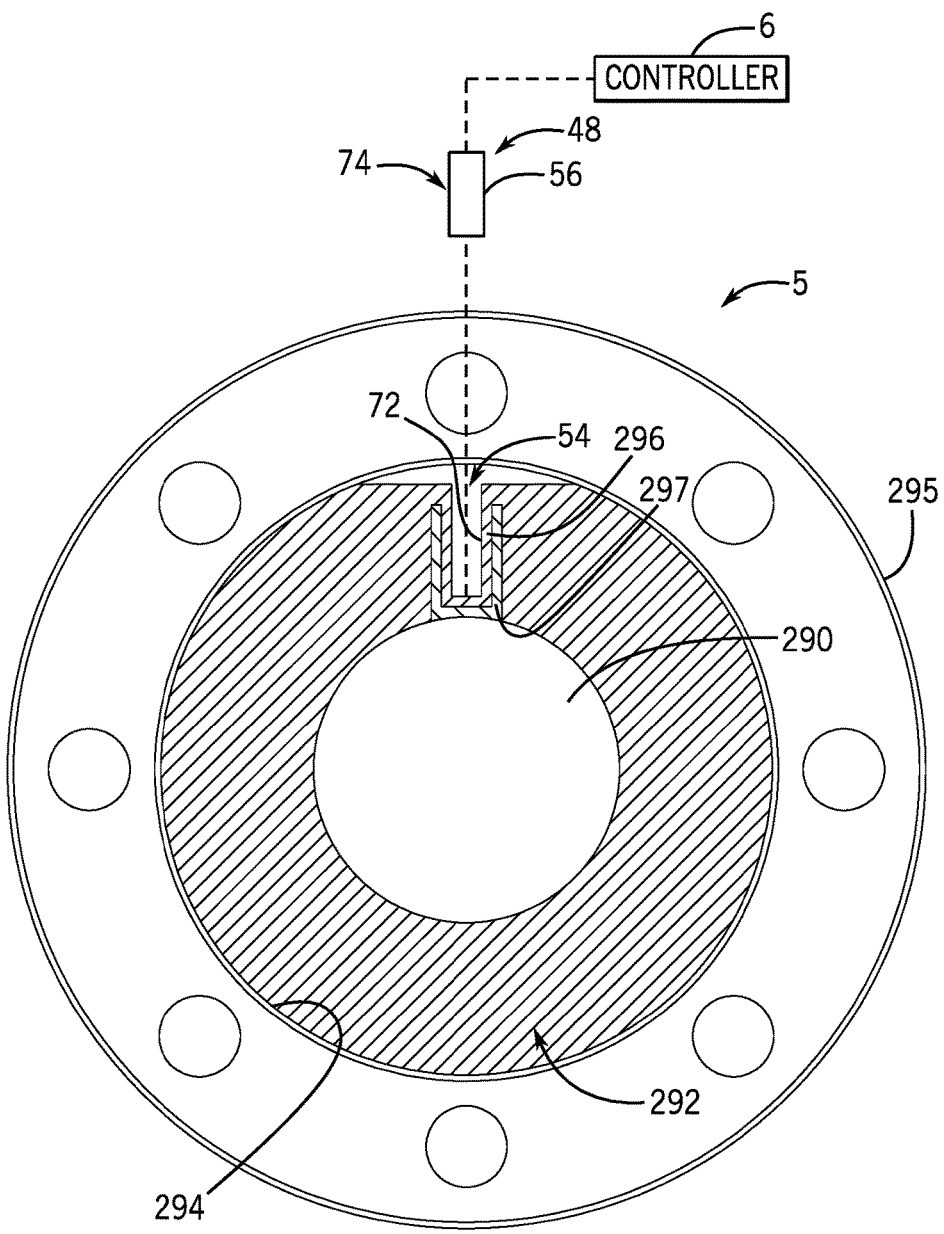
FIG. 21 is a cross-sectional view of a sensor adapter that may receive a non-invasive pressure sensor of the non-invasive pressure measurement system that may be utilized to control the HIPPS of FIG. 1, in accordance with an embodiment of the present disclosure.

The capacitance based pressure sensor 48 (e.g., the core 56, the insulative material 58, and/or the capacitor 60) as described with reference to FIGS. 3-20 may be incorporated into the non-invasive pressure measurement system 2 to determine operation of the HIPPS 1 (e.g., the controller 6 may instruct valves of the HIPPS 1 based on feedback from the non-invasive pressure measurement system 2). Further, the capacitance based pressure sensor 48 (e.g., alone or in combination with other non-invasive pressure sensors) may replace leakage lines in the HIPPS, thereby reducing costs and avoiding blockage within such leakage lines. For example, FIG. 21 is a section view of the sensor adapter 5 that may be coupled to the conduit 4, which may replace the leakage lines of the HIPPS (as well as the one or more pressure transmitters, one or more root valves, and/or one or more double block and bleed valves). As shown in the illustrated embodiment of FIG. 21, the sensor adapter 5 may include the cavity 54 configured to receive the capacitance based pressure sensor 48 (e.g., the core 56, the insulative material 58, and/or the capacitor 60).

In some embodiments, the sensor adapter 5 may be positioned between two segments of the conduit 4. Fluid may flow through a fluid flow passage or opening 290 of the sensor adapter 5 and the capacitance based pressure sensor 48 may be disposed in the cavity 54, which is formed in an outer wall or pressure barrier 292 of the sensor adapter 5 (e.g., a shell or casing between an interior surface 294 along the opening 290 and an exterior surface 295 of the sensor adapter 5). In the illustrated embodiment, the wall 292 of the sensor adapter 5 includes a sensor wall portion 296 disposed in a recessed portion 297 extending radially into the wall 292 from the interior surface 294. The sensor wall portion 296 and the recessed portion 297 may be coaxial or concentric with one another. For example, the sensor wall portion 296 may include a cup-shaped annular portion surrounded by the recessed portion 297, which may be an annular recess. As a result, the fluid may enter the recessed portion 297 and exhibit forces to deflect the sensor wall portion 296 in radial and circumferential directions. Therefore, the capacitance based pressure sensor 48 does not directly contact the fluid flowing through the sensor adapter 5. The capacitance based pressure sensor 48 may determine a pressure of the fluid flowing through the sensor adapter 5 in accordance with the embodiments discussed above with reference to FIGS. 3-20.

For example, the capacitance based pressure sensor 48 may incur changes in capacitance as the pressure of the fluid changes (e.g., pressure from the fluid causes the distance 104 between the interior surface 72 of the housing 50 and the outer surface 74 of the core 56 to change). As discussed above, the capacitance based pressure sensor 48 may be coupled (e.g., wirelessly or through a wired connection) to the controller 6, which may open and/or close the HIPPS 1 based on feedback received from the capacitance based pressure sensor 48. In some embodiments, a plurality of the sensor adapters 5 may be disposed in series along the conduit 4 and coupled to the controller 6. Additionally or alternatively, more than one capacitance based pressure sensor 48 and/or another non-invasive pressure sensor 7 may be disposed in each sensor adapter 5. As will be discussed in more detail below with reference to FIGS. 29 and 30, the controller 6 may compare feedback received from one or more capacitance based pressure sensors 48 to determine whether to open and/or close the HIPPS 1 (e.g., by executing a voting mode).

Figure 22:
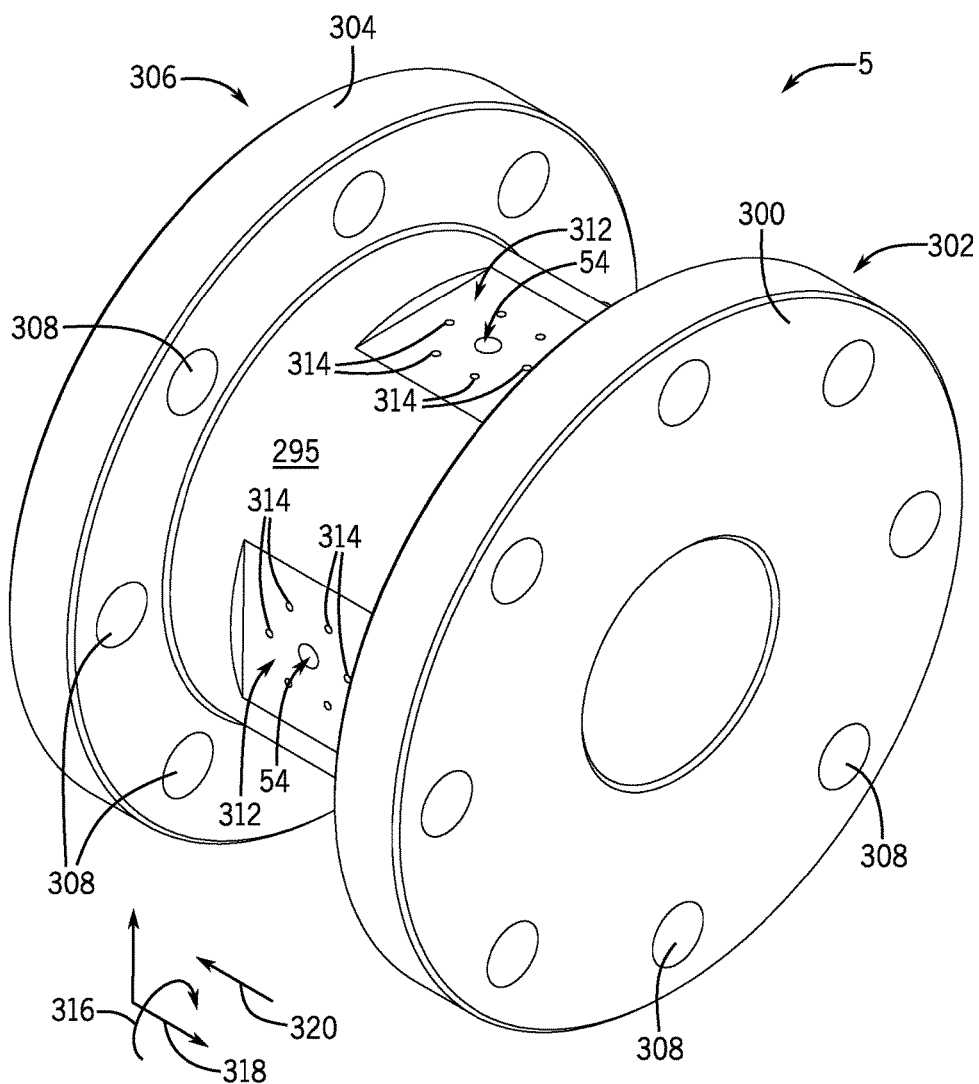
FIG. 22 is a perspective view of an embodiment of the sensor adapter of FIG. 21, in accordance with an embodiment of the present disclosure.

FIG. 22 is a perspective view of the sensor adapter 5 that includes multiple cavities 54 that are each configured to receive capacitance based pressure sensors 48 and/or other non-invasive pressure sensors 7. As shown in the illustrated embodiment of FIG. 22, the sensor adapter 5 includes a first flange 300 configured to couple a first end 302 of the sensor adapter 5 to the conduit 4 (e.g., a first segment of the conduit 4) and a second flange 304 configured to couple a second end 306 of the sensor adapter 5 to the conduit 4 (e.g., a second segment of the conduit 4). Accordingly, the first flange 300 and/or the second flange 304 may include apertures 308 that may receive fasteners (e.g., threaded fasteners and/or bolts) to secure the first flange 300 to the first segment of the conduit 4 and the second flange 304 to the second segment of the conduit 4.

In the illustrated embodiment of FIG. 22, the sensor adapter 5 includes multiple cavities 54, such that more than one non-invasive pressure sensor 7 (e.g., the capacitance based pressure sensor 48) may monitor the pressure in the sensor adapter 5. The sensor adapter 5 may include the exterior surface 295 (e.g., annular outer surface) that includes planar surfaces 312 (e.g., level or flat surfaces) configured to facilitate securing the non-invasive pressure sensors 7 in the cavities 54 or otherwise to the sensor adapter 5. For example, the planar surfaces 312 may include one or more openings 314 (e.g., threaded openings) configured to receive fasteners (e.g., threaded fasteners and/or bolts) that secure the non-invasive pressure sensors 7 to the sensor adapter 5 (e.g., in the cavity 54). In some embodiments, the non-invasive pressure sensors 7 may include flanges and/or other corresponding flat (e.g., level) surfaces that may be coupled to the planar surfaces 312 via the fasteners. Accordingly, the non-invasive pressure sensors 7 may be secured within the cavities 54 and/or otherwise to the sensor adapter 5. It should be noted that while the illustrated embodiment of FIG. 22 shows two of the cavities 54 and two corresponding planar surfaces 312, other embodiments may include one cavity 54 and one corresponding planar surface 312 or more than two cavities 54 and more than two corresponding planar surfaces 312 (e.g., three, four, five, six, seven, eight, nine, ten or more). Additionally, in some embodiments, the cavities 54 may be uniformly spaced in a circumferential direction 316 along the sensor adapter 5 (e.g., with respect to an axis 318) and/or in an axial direction 320 along the sensor adapter 5 (e.g., with respect to the axis 318). In other embodiments, the cavities 54 may be non-uniformly spaced in the circumferential direction 316 and/or the axial direction 320 along the sensor adapter 5.

FIG. 23 is a partial cutaway view of an embodiment of the sensor adapter 5 of FIG. 22 showing the cavity 54 and the corresponding gap 102 that may be formed in the pressure barrier 292 of the sensor adapter 5. As shown in the illustrated embodiment of FIG. 23, the cavity 54 may extend a distance 330 radially inward (e.g., with respect to an axis 331) into the pressure barrier 292. The distance 330 may be predetermined to enable the non-invasive pressure sensor 7 (e.g., the capacitance based pressure sensor 292) to accurately determine the pressure of the fluid flowing through the conduit 4. Additionally, the gap 102 may extend a second distance 332 from the interior surface 294 of the pressure barrier 292 radially outward (e.g., with respect to the axis 331) toward the exterior surface 295 of the sensor adapter 5. It should be recognized that the distances 330 and 332 may depend on one another and be configured to enable the non-invasive pressure sensor 7 to accurately measure the pressure of the fluid flowing through the conduit 4 (e.g., the housing 50 may experience sufficient force from the pressure of the fluid in the sensor adapter 5 to accurately determine the pressure of the fluid). For example, distances 330 and 332 may be configured such that sufficient forces may be applied to (and thus detected by) the capacitance based pressure sensor 292 when the fluid enters the recessed portion 297 and exhibits forces that deflect the sensor wall portion 296 in a radial direction 333 and the circumferential direction 316.

Additionally, FIG. 23 illustrates that the openings 314 may extend a third distance 336 into the pressure barrier 292 (e.g., from the exterior surface 295 toward the inner surface 334). In some cases, the distance 336 may be predetermined based at least on a length of the fasteners that may be utilized to secure the non-invasive pressure sensor in the cavity 54 and/or otherwise to the sensor adapter 5.

Figure 24:
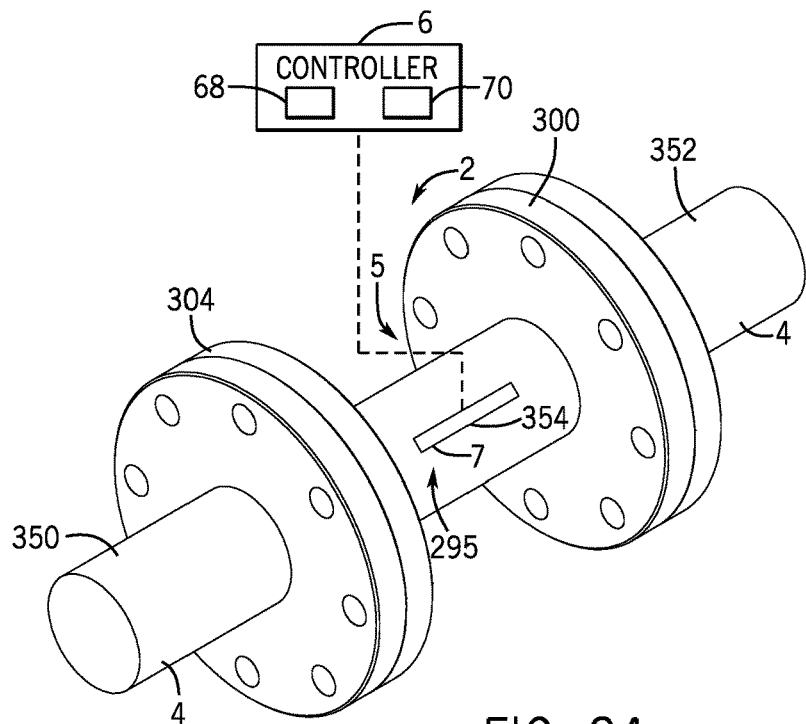
FIG. 24 is a perspective view of an embodiment of the sensor adapter that includes a strain gauge to monitor a pressure of fluid flowing through a conduit, in accordance with an embodiment of the present disclosure.

While the above discussion focuses on utilizing the capacitance based pressure sensor 48 in the non-invasive pressure measurement system 2, other types of non-invasive pressure sensors may be utilized, either in combination with or in lieu of, the capacitance based pressure sensor 48. For example, FIG. 24 is a perspective view of the sensor adapter 5 disposed between a first segment 350 of the conduit 4 (e.g., coupled via flange 304) and a second segment 352 of the conduit 4 (e.g., coupled via flange 300). In the illustrated embodiment of FIG. 24, the sensor adapter 5 may include an embodiment of the non-invasive pressure measurement system 2 that includes a strain gauge 354 (e.g., a non-invasive pressure sensor 7).

As used herein, the strain gauge 354 may be a pressure monitoring device that determines a pressure of the fluid in the conduit 4 based at least on a mechanical stress induced on the sensor adapter 5 (or the conduit 4) by the flow of fluid through the sensor adapter 5 (or the conduit 4). For example, in some embodiments, the strain gauge 354 may measure the mechanical stress (e.g., vibrations, deformation, and/or another measure of mechanical stress) induced on the exterior surface 295 of the sensor adapter 5 through changes in conductance and/or other electrical parameters (e.g., resistance). The strain gauge 354 may send feedback to the controller 6 indicative of the stress applied to the sensor adapter 5 by the pressure of the fluid. The controller 6 may then determine the pressure of the fluid flowing through the sensor adapter 5 using various algorithms and/or look-up tables (e.g., stored in the memory 70) based at least on the feedback indicative of the mechanical stress applied to the sensor adapter 5 (or the conduit 4).

In certain embodiments, the strain gauge 354 may be applied directly onto the exterior surface 295 of the sensor adapter 5 via an adhesive, a fastener (e.g., a threaded fastener or bolt), a clamp, a latch, a male/female joint, a sleeve, a mounting assembly, or any combination thereof.

Accordingly, the strain gauge 354 may monitor the mechanical stress of the sensor adapter 5, and thus, measure the pressure of the fluid in the sensor adapter 5 without directly contacting the fluid. While the illustrated embodiment of FIG. 24 shows the sensor adapter 5 having a single strain gauge 354, the sensor adapter 5 may include more than one strain gauge 354 (e.g., two, three, four, five, six, seven, eight, nine, ten, or more strain gauges 354). Further, in other embodiments, additional sensor adapters 5 may be disposed between the conduit segments 350, 352, where each sensor adapter 5 includes at least one non-invasive pressure sensor 7 (e.g., the capacitance based pressure sensor 48, the strain gauge 354, and/or another non-invasive pressure sensor 7). Accordingly, the controller 6 may open and/or close the HIPPS 1 based on feedback received from multiple non-invasive pressure sensors 7 of the non-invasive pressure measurement system 2.

Figure 25:
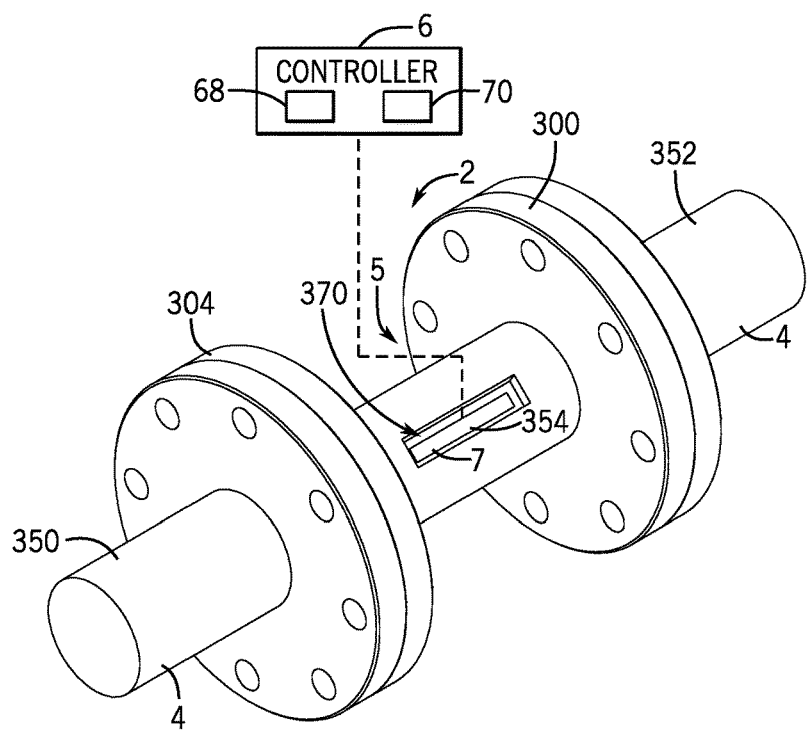
FIG. 25 is a perspective view of an embodiment of the sensor adapter that includes a recess configured to receive the strain gauge, in accordance with an embodiment of the present disclosure.

In some embodiments, the strain gauge 354 may be disposed in a recess 370, as shown in FIG. 25. For example, the sensor adapter 5 may include the recess 370, which may be cutout from the pressure barrier 292 of the sensor adapter 5. The recess 370 may be configured to receive the strain gauge 354 and enable the strain gauge 354 to be disposed closer to the flow of the fluid in the sensor adapter 5 (or the conduit 4) as a result of a reduced thickness of the recess 370 (e.g., as compared to the pressure barrier 292). In some cases, the strain gauge 354 may have improved accuracy as a result of the reduced thickness of the sensor adapter 5 at the recess 370. Accordingly, the strain gauge 354 may accurately determine the pressure of the fluid flowing through the conduit 4. While the illustrated embodiment of FIG. 25 shows the sensor adapter 5 having a single recess 370 and one strain gauge 354, it should be recognized that the sensor adapter 5 may include more than one recess 370 (e.g., two, three, four, five, six, seven, eight, nine, 10, or more) that each include one or more strain gauge 354. Additionally, in further embodiments, additional sensor adapters 5 may be disposed between the conduit segments 350, 352, where each sensor adapter 5 includes at least one recess 370 and at least one non-invasive pressure sensor 7 (e.g., the capacitance based pressure sensor 48, the strain gauge 354, and/or another non-invasive pressure sensor 7). Accordingly, the controller 6 may open and/or close the HIPPS 1 based on feedback received from multiple non-invasive pressure sensors 7 of the non-invasive pressure measurement system 2.

Figure 26:
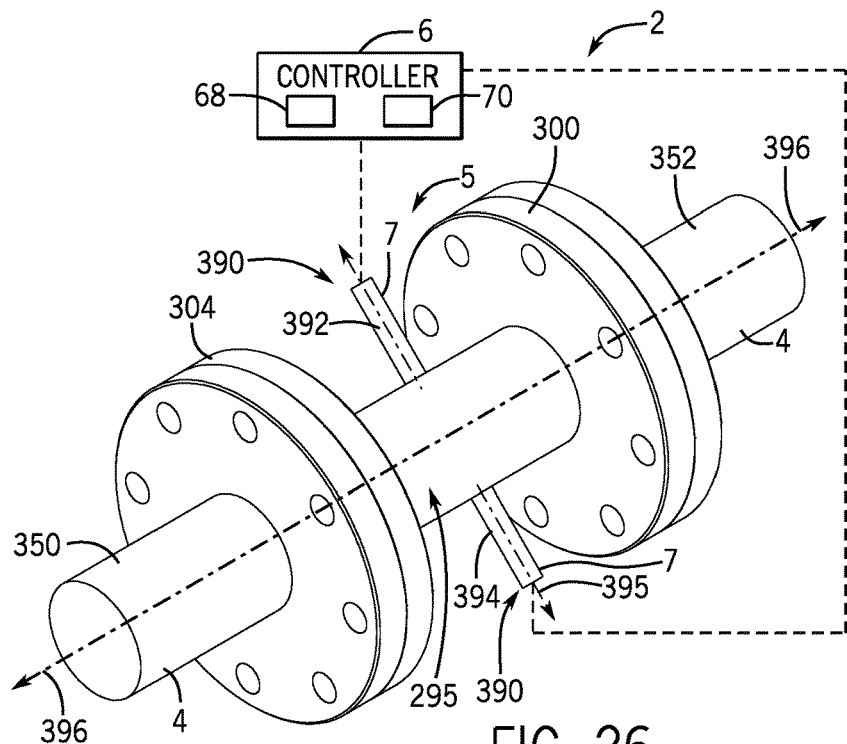
FIG. 26 is a perspective view of an embodiment of the sensor adapter that includes an ultrasonic pressure sensor to monitor a pressure of fluid flowing through a conduit, in accordance with an embodiment of the present disclosure.

In still further embodiments, the non-invasive pressure management system 2 may include an ultrasonic pressure sensor 390. For example, FIG. 26 is a perspective view of the sensor adapter 5 disposed between the conduit segments 350, 352 and including a pair of ultrasonic pressure sensors 390. As used herein, the ultrasonic pressure sensors 390 may each include an ultrasonic transducer that emits sound pulses at an ultrasonic frequency (e.g., frequencies above 15,000 Hertz, above 18,000 Hertz, or above 20,000 Hertz) into a flow path of the fluid flowing through the sensor adapter 5 (or the conduit 4). For example, the ultrasonic pressure sensor 390 may measure a time that it takes for an ultrasonic sound pulse (e.g., a sound wave at an ultrasonic frequency) to travel from a transmitter of a first ultrasonic transducer 392, through the flow path of the fluid, and to a receiver of a corresponding second ultrasonic transducer 394. The ultrasonic pressure sensors 390 may provide feedback to the controller 6 indicative of the transit times (e.g., travel times) of the ultrasonic pulses between the pair of ultrasonic pressure sensors 390. In some cases, the transit time of the ultrasonic pulse may be affected by a pressure of the fluid, such that the controller 6 may determine the pressure of the fluid flowing through the sensor adapter 5 (or the conduit 4) based at least on the transit time. For example, as a pressure of the fluid increases, the ultrasonic pulse may incur increased resistance, thereby increasing the transit time of the ultrasonic pulse. Similarly, as a pressure of the fluid decreases, the ultrasonic pulse may incur reduced resistance, thereby decreasing the transit time of the ultrasonic pulse.

As shown in the illustrated embodiment of FIG. 26, the sensor adapter 5 includes the pair of the ultrasonic pressure sensors 390 axially aligned with one another (e.g., along axis 395) on opposing sides of the sensor adapter 5. In some embodiments, the pair of ultrasonic pressure sensors 390 may be angled with respect to a flow of the fluid through the sensor adapter 5 such that the first ultrasonic transducer 392 is positioned upstream of the second ultrasonic transducer 394 with respect to the flow of the fluid. In some embodiments, the axis 395 may form an angle between 5 and 160 degrees, between 25 and 150 degrees, or between 30 and 120 degrees with respect to an axis 396 defining a direction of fluid flow. In other embodiments, the axis 395 may form an angle that is substantially 90 degrees with respect to the axis 396.

In some embodiments, the ultrasonic pressure sensors 390 may extend into the sensor adapter 5 via housings configured to isolate the ultrasonic pressure sensors 390 from the flow of the fluid. In other embodiments, the ultrasonic pressure sensors 390 may be disposed within the pressure barrier 292 and/or on the exterior surface 295 of the sensor adapter 5, such that ultrasonic sound pulses may permeate through the sensor adapter 5. In any case, ultrasonic sound pulse emitted from the first ultrasonic transducer 392 may be directed through the sensor adapter 5 (or the conduit 4) and received by the second ultrasonic transducer 394. Accordingly, the ultrasonic pressure sensor 390 may monitor a travel time of the ultrasonic sound pulse through the sensor adapter 5. The first and second ultrasonic transducers 392 and 394 may be coupled (e.g., wirelessly or through a wired connection) to the controller 6 and configured to send feedback to the controller 6 indicative of the travel time of the ultrasonic sound pulse. Accordingly, the controller 6 may determine a pressure of the fluid in the sensor adapter 5 (and the conduit 4) based at least on the travel time of the ultrasonic sound pulse.

While the illustrated embodiment of FIG. 26 illustrates one pair of ultrasonic pressure sensors 390 (and ultrasonic transducers 392, 394) disposed on the sensor adapter 5, more than one pair of ultrasonic pressure sensors 390 (e.g., two, three, four, five, six, seven, eight, nine, ten, or more pairs) may be included on the sensor adapter 5. Additionally, in further embodiments, additional sensor adapters 5 may be disposed between the conduit segments 350, 352, where each sensor adapter 5 includes at least one pair of the ultrasonic pressure sensors 390 and/or another non-invasive pressure sensor 7 (e.g., the capacitance based pressure sensor 48, the strain gauge 354, and/or another non-invasive pressure sensor 7). Accordingly, the controller 6 may open and/or close the HIPPS 1 based on feedback received from multiple non-invasive pressure sensors 7 of the non-invasive pressure measurement system 2.

Figure 27:
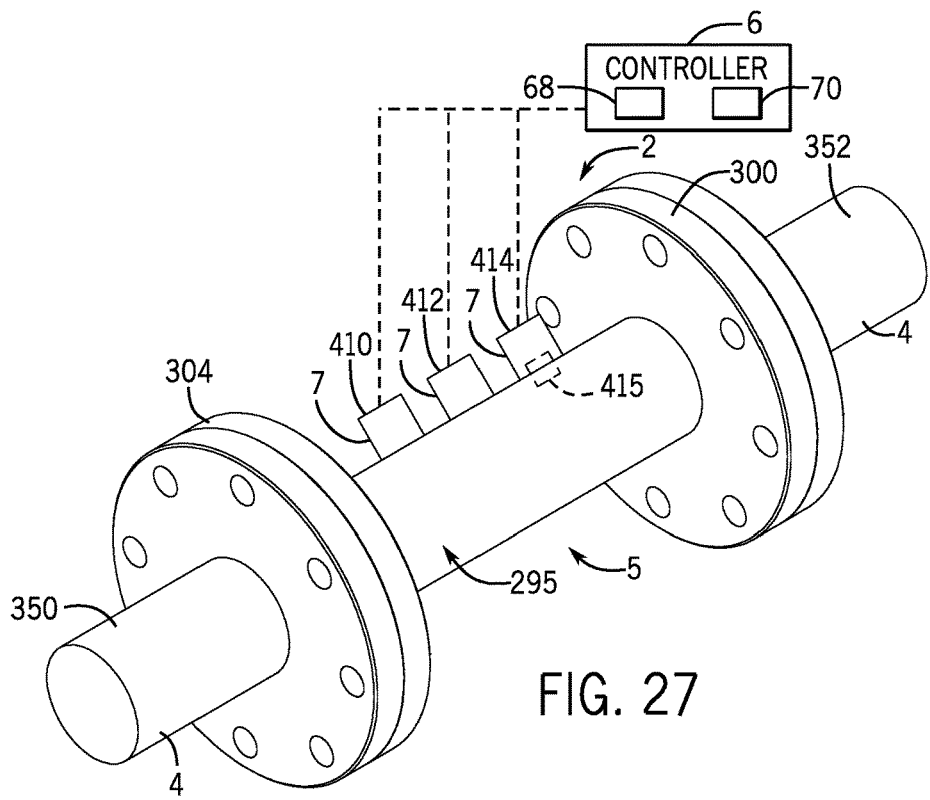
FIG. 27 is a perspective view of an embodiment of the sensor adapter that includes a surface acoustic wave (SAW) pressure sensor, a magnetic pressure sensor, and/or a fiber optic pressure sensor that may be used separate from one another, or in combination, to monitor a pressure of fluid flowing through a conduit, in accordance with an embodiment of the present disclosure.

In still further embodiments, the sensor adapter 5 may include other types of non-invasive pressure sensors 7, either in combination with or in lieu of the previously described non-invasive pressure sensors 7 (e.g., the capacitance based pressure sensor 48, the strain gauge 354, and/or the ultrasonic pressure sensor 390). For example, FIG. 27 is a perspective view of the sensor adapter 5 that includes a surface acoustic wave (SAW) pressure sensor 410, a magnetic pressure sensor 412, and a fiber optic pressure sensor 414.

As used herein, the SAW pressure sensor 410 may be configured to monitor acoustic waves on the exterior surface 295 of the sensor adapter 5. For example, the SAW pressure sensor 410 may be disposed on the exterior surface 295 of the sensor adapter 5 (or in the recess 370), such that the SAW pressure sensor may detect changes in an acoustic frequency of waves propagating through the exterior surface 295 of the sensor adapter 5. For example, waves may propagate through the exterior surface 295 via vibrations caused by the pressure of the fluid in the sensor adapter 5 and/or by acoustic sound pulses emitted by the SAW pressure sensor 410. In any case, the SAW pressure sensor 410 may send feedback to the controller 6 indicative of the acoustic frequencies of the waves propagating through the exterior surface 295 of the sensor adapter 5. The controller 6 may be configured to determine a pressure of the fluid flowing through the sensor adapter 5 (and/or the conduit 4) based on the acoustic frequencies of the waves propagating through the exterior surface 295 by using one or more algorithms and/or look-up tables (e.g., stored in the memory 70).

As used herein, the magnetic pressure sensor 412 may be configured to measure a pressure of the fluid flowing in the sensor adapter 5 based on changes in a magnetic circuit of the magnetic pressure sensor 412. For example, the magnetic pressure sensor 412 may be disposed on the exterior surface 295 of the sensor adapter 5 (or in the recess 370), such that the magnetic pressure sensor 412 may detect changes in the magnetic circuit caused by the pressure of the fluid flowing through the sensor adapter 5 (and/or the conduit 4). In some embodiments, the magnetic pressure sensor 412 may monitor a magnetic reluctance and/or a magnetic inductance of the fluid flowing through the sensor adapter 5 based on changes incurred by the magnetic circuit. In other embodiments, the magnetic pressure sensor 412 may generate a magnetic field and monitor changes in the magnetic reluctance and/or magnetic inductance of the magnetic field caused by changes in pressure of the fluid in the sensor adapter 5. The magnetic pressure sensor 412 may send feedback to the controller 6 indicative of the magnetic reluctance and/or magnetic inductance of the fluid flowing through the sensor adapter 5 (and/or the conduit 4). The controller 6 may be configured to determine a pressure of the fluid flowing through the sensor adapter 5 (and/or the conduit 4) based on the magnetic reluctance and/or the magnetic inductance by using one or more algorithms and/or look-up tables (e.g., stored in the memory 70).

As used herein, the fiber optic pressure sensor 414 may be configured to emit light toward a reflecting diaphragm 415 (e.g., a resilient, flexible, or movable diaphragm) disposed in the sensor adapter 5, which may reflect the light toward a fiber optic receiver of the fiber optic pressure sensor 414. In some cases, an intensity of the light received by the fiber optic receiver may be indicative of the pressure of the fluid flowing through the sensor adapter 5 (or the conduit 4). For example, as pressure increases, a wall of the diaphragm 415 of the fiber optic pressure sensor 414 may increase in size and surface area (e.g., as the reflecting diaphragm 415 expands), thereby affecting the intensity of the fiber optic light received by the fiber optic receiver. Similarly, as pressure decreases, the wall of the diaphragm 415 of the fiber optic pressure sensor 414 may decrease in size and surface area (e.g., as the reflecting diaphragm 415 contracts), thereby affecting the intensity of the fiber optic light received by the fiber optic receiver. Accordingly, the fiber optic pressure sensor 414 may send feedback to the controller 6 indicative of the intensity of the light received by the fiber optic receiver of the fiber optic pressure sensor 414. The controller 6 may be configured to determine a pressure of the fluid flowing through the sensor adapter 5 (and/or the conduit 4) based at least on the intensity of the light by using one or more algorithms and/or look-up tables (e.g., stored in the memory 70).

Accordingly, the controller 6 may be configured to receive feedback from multiple non-invasive pressure sensors 7 (e.g., the capacitance based pressure sensor 48, the strain gauge 354, the ultrasonic pressure sensor 390, the SAW pressure sensor 410, the magnetic pressure sensor 412, and/or the fiber optic pressure sensor 414) disposed in or along the sensor adapter 5. The controller 6 may determine whether to open and/or close the HIPPS 1 based on the feedback received the non-invasive pressure measurement system 2 (e.g., that includes multiple non-invasive pressure sensors 7). In certain embodiments, the controller 6 may be configured to perform in one or more operating modes based on the number of non-invasive pressure sensors 7 included in the non-invasive pressure measurement system 2, based on the number and/or type of valves included in the HIPPS 1, and/or based on the hydrocarbon extraction system 10 in which the HIPPS 1 is included.

Figure 28:
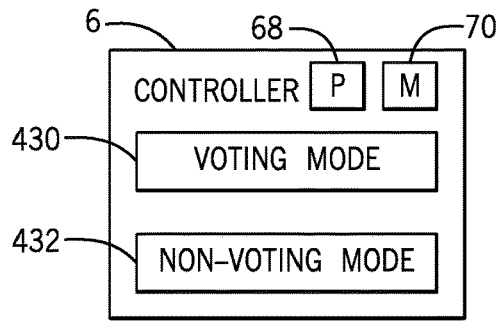
FIG. 28 is a schematic of a controller that may receive feedback from the non-invasive pressure measurement system and control the HIPPS based on the feedback using one or more control modes, in accordance with an embodiment of the present disclosure.

For example, FIG. 28 is a schematic of an embodiment of the controller 6 that may be utilized to control the HIPPS 1 based on feedback received from the non-invasive pressure measurement system 2. As shown in the illustrated embodiment of FIG. 28 may include the processor 68 and the memory 70. In some cases, the processor 68 may be configured to execute instructions stored on the memory 70. For example, the processor 68 may be configured to execute instructions corresponding to one or more control modes. As shown in the illustrated embodiment of FIG. 28, the processor 68 may be configured to execute a voting mode 430 and/or a non-voting mode 432. Accordingly, the controller 6 may execute one or both of the control modes 430 and/or 432 to determine whether to open and/or close one or more valves of the HIPPS 1.

As discussed above, the controller 6 may be configured to receive feedback from multiple non-invasive pressure sensors 7 of the non-invasive pressure measurement system 2. Accordingly, the controller 6 may close the one or more valves of the HIPPS 1 when a predetermined number (e.g., 2, 3, 4, 5, or more) of the non-invasive pressure sensors 7 provide feedback indicative of the pressure of the fluid flowing through the sensor adapter 5 (and/or the conduit 4) exceeding a predetermined pressure threshold. When fewer than the predetermined number of the non-invasive pressure sensors provide feedback indicative of the pressure of the fluid flowing through the sensor adapter 5 (and/or the conduit 4) exceeding the predetermined pressure threshold, the controller 6 may be configured to maintain a position of the one or more valves of the HIPPS 1. The voting mode 430 is described in more detail below with reference to FIG. 29.

Additionally, the controller 6 may execute the non-voting mode 432. In some embodiments, when operating in the non-voting mode, the controller 6 may be configured to close the one or more valves of the HIPPS 1 when a single non-invasive pressure sensor 7 provides feedback indicative of the pressure of the fluid flowing through the sensor adapter 5 (and/or the conduit 4) exceeding the predetermined pressure threshold. In other embodiments, the controller 6 may be configured to average the pressure feedback from the multiple non-invasive pressure sensors 7 and compare the average pressure to the predetermined pressure threshold to determine whether to close the one or more valves of the HIPPS 1. The non-voting mode is discussed in more detail below with reference to FIG. 30.

Figure 29:
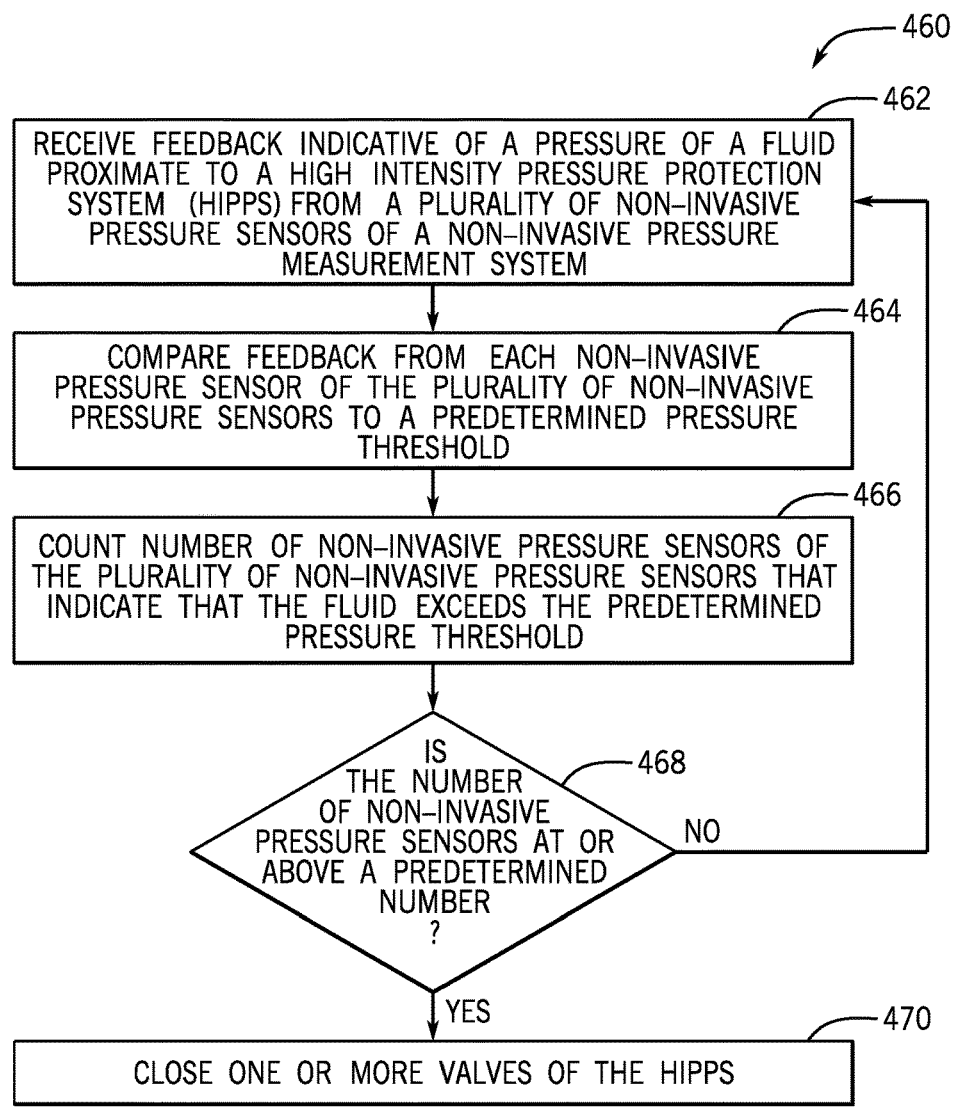
FIG. 29 is flow chart of an embodiment of a process that may be executed to control a position of one or more valves in the HIPPS of FIG. 1 based on feedback from the non-invasive pressure measurement system, in accordance with an embodiment of the present disclosure.

FIG. 29 is a flow chart of an embodiment of a process 460 that may be executed by the controller 6 (e.g., the processor 68) when operating in the voting mode 430. At block 462, the controller 6 may be configured to receive feedback indicative of the pressure of the fluid flowing through the sensor adapter 5 (and/or the conduit 4) that is proximate to the HIPPS 1. For example, a plurality of non-invasive pressure sensors 7 of the non-invasive pressure measurement system 2 may be coupled (e.g., wirelessly and/or through a wired connection) to the controller 6, such that the plurality of non-invasive pressure sensors 7 may provide feedback to the controller 6. In some embodiments, the non-invasive pressure measurement system 2 may include one or more of the capacitance based pressure sensor 48, the strain gauge 354, the ultrasonic pressure sensor 390, the SAW pressure sensor 410, the magnetic pressure sensor 412, the fiber optic sensor 414, or any combination thereof.

Accordingly, at block 464, the controller 6 may compare the feedback from each non-invasive pressure sensor 7 of the plurality of non-invasive pressure sensors 7 to the predetermined pressure threshold. In some embodiments, the threshold pressure may be based on a standard and/or regulation of the hydrocarbon extraction system 10 and/or a destination of the fluid in the conduit 4. At block 466, the controller 6 may count a number of the non-invasive pressure sensors 7 of the plurality of non-invasive pressure sensors 7 indicating that the fluid flowing through the sensor adapter 5 (and/or the conduit 4) exceeds the predetermined pressure threshold.

At block 468, the controller 6 may determine whether the number of the non-invasive pressure sensors 7 determined at block 466 exceeds a predetermined number (e.g., 1, 2, 3, 4, 5, 6, 7, 8, 9, 10, or more). For example, the predetermined number may be a majority or a predetermined percentage (e.g., between 30% and 95%, between 35% and 80%, or between 40% and 60%) of the total number of the plurality of non-invasive pressure sensors 7. Additionally, the predetermined number may be based on standards and/or regulations set by a governing body. Accordingly, when the number of the non-invasive pressure sensors 7 indicating that the pressure of the fluid flowing through the sensor adapter 5 (and/or the conduit 4) exceeds the predetermined pressure threshold is above the predetermined number, the controller 6 may instruct one or more of the valves of the HIPPS 1 to close (e.g., via an actuator), as shown at block 470. Conversely, when the number of the non-invasive pressure sensors indicating that the pressure of the fluid flowing through the sensor adapter 5 (and/or the conduit 4) exceeds the predetermined pressure threshold is not above the predetermined number, the process 460 may repeat. Therefore, the controller 6 may continue to receive feedback from the plurality of non-invasive pressure sensors 7, as shown at block 462.

Figure 30:
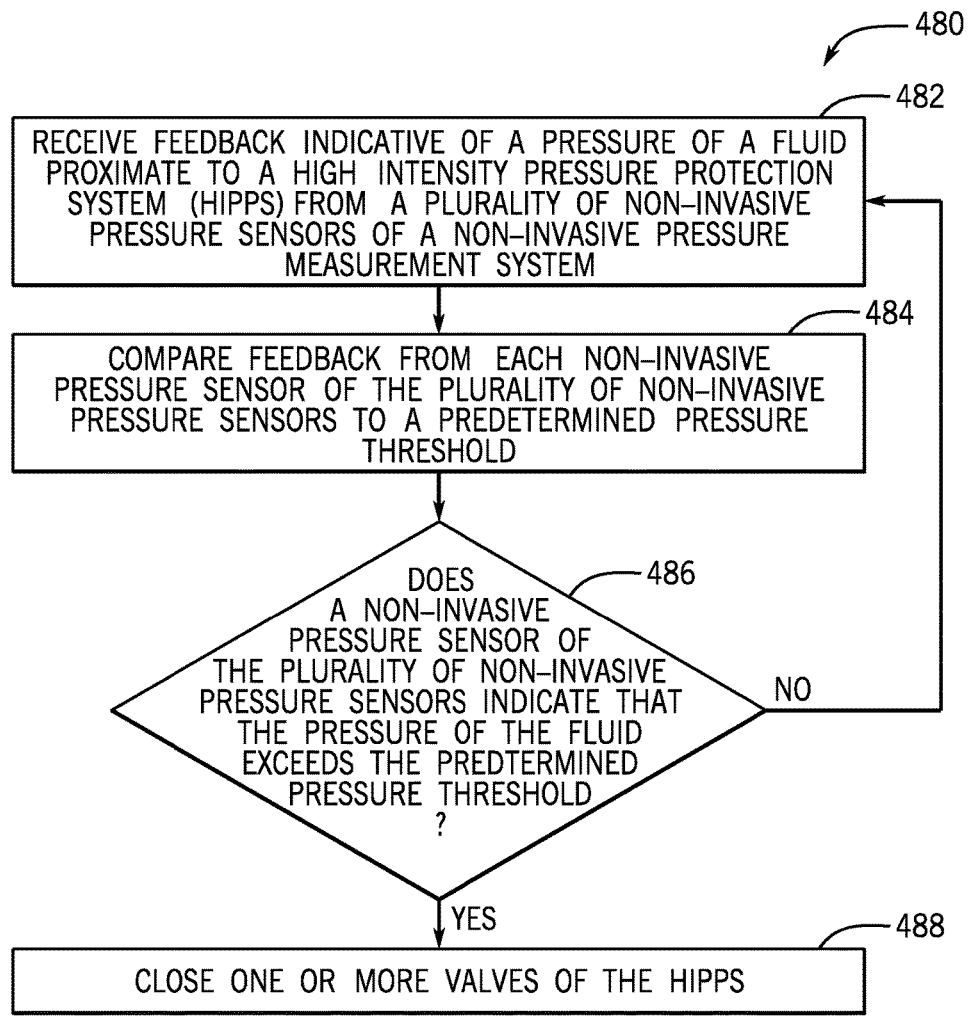
FIG. 30 is flow chart of an embodiment of a process that may be executed to control a position of one or more valves of the HIPPS of FIG. 1 based on feedback from the non-invasive pressure measurement system, in accordance with an embodiment of the present disclosure.

FIG. 30 is a flow chart of an embodiment of a process 480 that may be executed by the controller 6 (e.g., the processor 68) when operating in the non-voting mode 432. At block 482, the controller 6 may be configured to receive feedback indicative of the pressure of the fluid flowing through the sensor adapter 5 (and/or the conduit 4) that is proximate to the HIPPS 1. For example, a plurality of non-invasive pressure sensors 7 of the non-invasive pressure measurement system 2 may be coupled (e.g., wirelessly and/or through a wired connection) to the controller 6, such that the plurality of non-invasive pressure sensors 7 may provide feedback to the controller 6. In some embodiments, the non-invasive pressure measurement system 2 may include one or more of the capacitance based pressure sensor 48, the strain gauge 354, the ultrasonic pressure sensor 390, the SAW pressure sensor 410, the magnetic pressure sensor 412, the fiber optic sensor 414, or any combination thereof.

Accordingly, at block 484, the controller 6 may compare the feedback from each non-invasive pressure sensor 7 of the plurality of non-invasive pressure sensors 7 to the predetermined pressure threshold. In some embodiments, the predetermined threshold pressure may be based on a standard and/or regulation of the hydrocarbon extraction system 10 and/or a destination of the fluid in the conduit 4. When operating in the non-voting mode 432, the controller 6 may be configured to adjust a position of the one or more valves of the HIPPS 1 when a single non-invasive pressure sensor 7 of the plurality of non-invasive pressure sensors 7 exceeds the predetermined pressure threshold.

For example, at block 486, the controller 6 may determine whether any of the non-invasive pressure sensors 7 of the plurality of non-invasive pressure sensors 7 indicate that the pressure of the fluid exceeds the predetermined pressure threshold. When one or more of the non-invasive pressure sensors 7 of the plurality of non-invasive pressure sensors indicate that the fluid pressure does exceed the predetermined pressure threshold, the controller 6 may instruct the one or more valves of the HIPPS 1 to close (e.g., via an actuator), as shown at block 488. Conversely, when none of the non-invasive pressure sensors of the plurality of non-invasive pressure sensors indicate that the pressure of the fluid flowing through the sensor adapter 5 (and/or the conduit 4) exceeds the predetermined pressure threshold, the controller 6 may maintain a position of the one or more valves of the HIPPS 1. Accordingly, the controller 6 may be configured to repeat the process 480 and return to block 482.

In other embodiments, the controller 6 may be configured to control the one or more valves of the HIPPS 1 using other pressure-based control. For example, the controller 6 may be configured to adjust a position of the one or more valves of the HIPPS 1 using multiple thresholds (e.g., tiered thresholds). As a non-limiting example, the controller 6 may be configured to close the one or more valves of the HIPPS 1 when a first amount (or percentage) of the non-invasive pressure sensors 7 indicate that the pressure of the fluid exceeds a first pressure threshold. Additionally, the controller 6 may be configured to close the one or more valves of the HIPPS 1 when a second amount (or percentage) of the non-invasive pressure sensors 7 indicate that the pressure of the fluid exceeds a second pressure threshold. In some embodiments, the first amount (or percentage) of the non-invasive pressure sensors 7 may be larger than the second amount (or percentage) of the non-invasive pressure sensors 7, and the first pressure threshold may be a lower pressure than the second pressure threshold. Accordingly, a larger number (or percentage) of non-invasive pressure sensors 7 may indicate that the fluid pressure exceeds a lower pressure threshold before the controller 6 may close the one or more valves of the HIPPS 1 (e.g., as compared to the second pressure threshold that is greater than the first pressure threshold). Additionally, in some cases, the controller 6 may close the one or more valves of the HIPPS 1 upon receiving feedback from a single non-invasive pressure sensor 7 indicating that the pressure of the fluid exceeds an upper pressure threshold.

Additionally or alternatively, the controller 6 may be configured to adjust the position of the one or more valves of the HIPPS 1 based on a weighted average pressure from each of the non-invasive pressure sensors 7. For example, in some cases, a first non-invasive pressure sensor 7 may be located in a first position along the conduit 4 and a second non-invasive pressure sensor 7 may be located in a second position along the conduit 4. In some cases, the first position may experience greater wear and/or stress than the second position (e.g., the first position may be at an elbow of the conduit 4). Accordingly, the controller 6 may assign the feedback from the first non-invasive pressure sensor 7 a first weight (e.g., 2, 3, 4, 5, or more) greater than a second weight (e.g., 1, 1.5, 1.9, or 2) assigned to the second non-invasive pressure sensor 7. When the controller 6 receives feedback from the non-invasive pressure sensors 7 that includes a weighted average pressure that exceeds a threshold, the controller 6 may be configured to close the one or more valves of the HIPPS 1. In some cases, assigning weights to the non-invasive pressure sensors 7 located in positions that experience enhanced wear and/or stress may reduce maintenance times and costs.

Further, the controller 6 may be configured to adjust the position of the one or more valves of the HIPPS 1 to a partially open position before adjusting the one or more valves of the HIPPS 1 to the closed position (e.g., completely blocking the flow of fluid). In some embodiments, the controller 6 may adjust the one or more valves to a first partially open position (e.g., 50% of flow) when feedback from one or more of the non-invasive pressure sensors 7 exceeds a first pressure threshold. Similarly, the controller 6 may adjust the one or more valves to a second partially open position (e.g., 75% of flow) when the feedback from the one or more non-invasive pressure sensors 7 exceeds a second pressure threshold, greater than the first pressure threshold. Ultimately, the controller 6 may adjust the one or more valves of the HIPPS 1 to the closed position when the feedback from the one or more non-invasive pressure sensors 7 exceeds an upper pressure threshold. Accordingly, the HIPPS 1 may begin to reduce a flow of the fluid through the conduit 4 before completely blocking the flow of the fluid through the conduit 4

In other embodiments, the controller 6 may also be configured to adjust a position of each valve of the one or more valves of the HIPPS 1 at various pressure thresholds. For example, the controller 6 may be configured to close a first valve of the one or more valves of the HIPPS 1 when feedback from the one or more non-invasive pressure sensors 7 exceeds a first pressure threshold. Additionally, the controller 6 may be configured to close a second valve (in addition to the first valve) of the one or more valves of the HIPPS 1 when feedback from the one or more non-invasive pressure sensors 7 exceeds a second pressure threshold, greater than the first pressure threshold. Ultimately, the controller 6 may adjust all of the one or more valves of the HIPPS 1 to the closed position when the feedback from the one or more non-invasive pressure sensors 7 exceeds an upper pressure threshold. Accordingly, the controller 6 may reduce the flow of the fluid through the conduit 4 by closing the various valves before completely blocking the flow of the fluid through the conduit.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is to cover all modifications, equivalents, and alternatives falling within the spirit and scope of the disclosure as defined by the following appended claims.

The invention claimed is:

1. A system, comprising:
a safety system comprising one or more valves configured to block a flow of fluid from a source to a destination;
a non-invasive pressure measurement system comprising a plurality of non-invasive pressure sensors configured to monitor a pressure of the fluid without directly contacting the fluid, wherein a non-invasive pressure sensor of the plurality of non-invasive pressure sensors comprises a strain gauge, and wherein the strain gauge is disposed in a recess formed in a conduit configured to flow the fluid from the source to the destination, wherein the recess is positioned downstream of the safety system with respect to the flow of the fluid through the conduit, wherein the strain gauge is configured to measure a mechanical stress to the conduit caused by the pressure of the fluid, and wherein the mechanical stress is indicative of the pressure of the fluid; and
a controller configured to receive feedback from the non-invasive pressure measurement system and to adjust a position of the one or more valves of the safety system based on the feedback.

2. The system of claim 1, wherein an additional non-invasive pressure sensor of the non-invasive pressure sensors comprises a capacitance based pressure sensor.

3. The system of claim 2, wherein the capacitance based pressure sensor is configured to be disposed in a cavity separate from a fluid flow passage in a sensor adapter disposed downstream of the safety system with respect to the flow of the fluid.

4. The system of claim 3, wherein the capacitance based pressure sensor comprises a core and an insulative material configured to form a capacitor in the cavity.

5. The system of claim 4, wherein the pressure of the fluid within the sensor adapter is configured to change a distance between the core and a surface of the cavity, thereby changing a capacitance of the capacitor, and wherein the change in capacitance is indicative of the pressure of the fluid.

6. The system of claim 1, wherein an additional non-invasive pressure sensor of the non-invasive pressure sensors comprises an ultrasonic pressure sensor.

7. The system of claim 6, wherein the ultrasonic pressure sensor is configured to emit an ultrasonic sound pulse and to determine a travel time of the ultrasonic sound pulse through a sensor adapter disposed downstream of the safety system, and wherein the travel time of the ultrasonic sound pulse is indicative of the pressure of the fluid.

8. The system of claim 1, wherein the plurality of non-invasive pressure sensors comprises one or more of a capacitance based pressure sensor, an additional strain gauge, an ultrasonic pressure sensor, a surface acoustic wave (SAW) pressure sensor, a magnetic pressure sensor, a fiber optic pressure sensor, or any combination thereof.

9. The system of claim 1, wherein the controller is configured to adjust a position of the one or more valves of the safety system when the feedback from a predetermined number of non-invasive pressure sensors of the plurality of non-invasive pressure sensors indicates that the pressure of the fluid exceeds a predetermined pressure threshold.

10. The system of claim 9, wherein the predetermined number of non-invasive pressure sensors of the plurality of non-invasive pressure sensors is a majority of non-invasive pressure sensors of the plurality of non-invasive pressure sensors.

11. The system of claim 1, wherein the safety system is a high integrity pressure protection system (HIPPS).

12. The system of claim 1, wherein the conduit comprises a sensor adapter disposed between a first segment of the conduit and a second segment of the conduit, wherein the recess is formed in the sensor adapter.

13. The system of claim 12, wherein a first thickness of the first segment of the conduit is less than a second thickness of the sensor adapter at the recess.

14. The system of claim 1, wherein the strain gauge is secured within the recess via an adhesive.

15. A system, comprising:
a safety system disposed along a conduit configured to direct a fluid from a source to a destination, wherein the safety system comprises one or more valves configured to block a flow of the fluid to the destination when the one or more valves are in a closed position;
a sensor adapter fluidly coupled to the conduit, wherein the sensor adapter is configured to be disposed between a first segment of the conduit and a second segment of the conduit, wherein the sensor adapter comprises a cavity extending into a wall of the sensor adapter from an external surface of the sensor adapter, and wherein the sensor adapter comprises a recessed portion extending radially into the wall from an interior surface of the sensor adapter;
a non-invasive pressure measurement system coupled to the sensor adapter, wherein the non-invasive pressure measurement system comprises a plurality of non-invasive pressure sensors, wherein a non-invasive pressure sensor of the plurality of non-invasive pressure sensors comprises a capacitance based pressure sensor, wherein the non-invasive pressure measurement system is configured to monitor a pressure of the fluid without directly contacting the fluid, wherein the capacitance based pressure sensor comprises a core and an insulative material disposed in the cavity of the sensor adapter to form a capacitor, the capacitance based pressure sensor is configured to measure changes in capacitance of the capacitor as a distance between the core and a surface of the cavity changes due to the pressure of the fluid in the recessed portion of the sensor adapter, and wherein the changes in capacitance of the capacitor are indicative of the pressure of the fluid; and
a controller configured to receive feedback from the non-invasive pressure measurement system and to adjust a position of the one or more valves of the safety system based on the feedback.

16. The system of claim 15, wherein an additional non-invasive pressure sensor of the plurality of non-invasive pressure sensors comprises a strain gauge, the strain gauge is disposed in a recess formed in the external wall of the sensor adapter, the strain gauge is configured to monitor mechanical stress incurred by the sensor adapter due to the pressure of the fluid, and wherein the mechanical stress is indicative of the pressure in the fluid.

17. The system of claim 15, wherein an additional non-invasive pressure sensor of the plurality of non-invasive pressure sensors comprises a pair of the ultrasonic pressure sensors, the pair of the ultrasonic pressure sensors are aligned coaxially along the sensor adapter, the pair of ultrasonic pressure sensors are configured to emit an ultrasonic sound pulse and measure a travel time of the ultrasonic sound pulse through the sensor adapter, and wherein the travel time of the ultrasonic sound pulse is indicative of the pressure of the fluid.

18. The system of claim 15, wherein the sensor adapter comprises an additional cavity extending into the wall of the sensor adapter from the external surface of the sensor adapter, wherein the sensor adapter comprises an additional recessed portion extending radially into the wall from the interior surface of the sensor adapter, wherein the plurality of non-invasive pressure sensors comprises an additional capacitance based pressure sensor, wherein the additional capacitance based pressure sensor comprises an additional core and an additional insulative material disposed in the additional cavity of the sensor adapter to form an additional capacitor.

19. The system of claim 15, wherein the sensor adapter comprises an opening in the external surface of the sensor adapter, wherein the opening is configured to secure the capacitance based pressure sensor within the cavity.

\* \* \* \* \*